US012350953B2

(12) United States Patent
Loginov et al.

(10) Patent No.: US 12,350,953 B2
(45) Date of Patent: Jul. 8, 2025

(54) MAGNETIC ASSEMBLIES AND PROCESSES FOR PRODUCING OPTICAL EFFECT LAYERS COMPRISING ORIENTED NON-SPHERICAL MAGNETIC OR MAGNETIZABLE PIGMENT PARTICLES

(71) Applicant: SICPA HOLDING SA, Prilly (CH)

(72) Inventors: Evgeny Loginov, Renens (CH); Mathieu Schmid, Lausanne (CH); Claude-Alain Despland, Bussigny (CH)

(73) Assignee: SICPA HOLDING SA, Prilly (CH)

( * ) Notice: Subject to any disclaimer, the term of this patent is extended or adjusted under 35 U.S.C. 154(b) by 352 days.

(21) Appl. No.: 17/772,788

(22) PCT Filed: Oct. 23, 2020

(86) PCT No.: PCT/EP2020/079925
§ 371 (c)(1),
(2) Date: Apr. 28, 2022

(87) PCT Pub. No.: WO2021/083808
PCT Pub. Date: May 6, 2021

(65) Prior Publication Data

US 2022/0388327 A1 Dec. 8, 2022

(30) Foreign Application Priority Data

Oct. 28, 2019 (EP) .................................... 19205716

(51) Int. Cl.
*B41M 3/14* (2006.01)
*B05D 3/00* (2006.01)
(Continued)

(52) U.S. Cl.
CPC ........... *B42D 25/369* (2014.10); *B05D 3/067* (2013.01); *B05D 3/207* (2013.01); *B05D 5/065* (2013.01);
(Continued)

(58) Field of Classification Search
CPC ......... B42D 25/29; G06K 19/16; G06K 19/18; B41F 19/05; B41M 3/14; B05D 5/06;
(Continued)

(56) References Cited

U.S. PATENT DOCUMENTS

| | | | |
|---|---|---|---|
| 2,570,856 | A | 10/1951 | Pratt et al. |
| 3,676,273 | A | 7/1972 | Graves |

(Continued)

FOREIGN PATENT DOCUMENTS

| | | |
|---|---|---|
| CN | 102883891 | 1/2013 |
| CN | 102529326 | 8/2014 |

(Continued)

OTHER PUBLICATIONS

Benenson et al, Handbook of Physics, Springer 2002, p. 463.

(Continued)

*Primary Examiner* — Tabassom Tadayyon Eslami
(74) *Attorney, Agent, or Firm* — MUNCY, GEISSLER, OLDS & LOWE, P.C.

(57) ABSTRACT

The present invention relates to the field of magnetic assemblies and processes for producing optical effect layers (OELs) comprising magnetically oriented non-spherical magnetic or magnetizable pigment particles on a substrate. In particular, the present invention relates to magnetic assemblies processes for producing said OELs as anti-counterfeit means on security documents or security articles or for decorative purposes.

18 Claims, 13 Drawing Sheets

(51) Int. Cl.

| | |
|---|---|
| ***B05D 3/06*** | (2006.01) |
| ***B05D 5/06*** | (2006.01) |
| ***B41F 13/193*** | (2006.01) |
| ***B42D 25/369*** | (2014.01) |
| ***H01F 41/16*** | (2006.01) |
| *B42D 25/364* | (2014.01) |
| *G09F 3/00* | (2006.01) |

(52) U.S. Cl.
CPC .......... *B41F 13/193* (2013.01); *B42D 25/364* (2014.10); *G09F 3/0292* (2013.01)

(58) Field of Classification Search
CPC ........ B05D 5/065; B05D 5/063; B05D 5/061; B05D 5/066; B05D 3/207; H01F 41/16
See application file for complete search history.

(56) References Cited

U.S. PATENT DOCUMENTS

| | | | |
|---|---|---|---|
| 3,791,864 A | 2/1974 | Steingroever | |
| 4,838,648 A | 6/1989 | Phillips et al. | |
| 5,364,689 A | 11/1994 | Kashiwagi et al. | |
| 5,630,877 A | 5/1997 | Kashiwagi et al. | |
| 6,410,130 B1 | 6/2002 | Schuhmacher et al. | |
| 6,531,221 B1 | 3/2003 | Schuhmacher et al. | |
| 6,582,781 B1 | 6/2003 | Schuhmacher et al. | |
| 6,838,166 B2 | 1/2005 | Phillips et al. | |
| 2005/0106367 A1 | 5/2005 | Raksha et al. | |
| 2007/0172261 A1 | 7/2007 | Raksha et al. | |
| 2010/0040845 A1* | 2/2010 | Schmid ................ | B42D 25/324 118/640 |
| 2013/0029112 A1 | 1/2013 | Bargir et al. | |
| 2013/0329275 A1 | 12/2013 | Lahann et al. | |

FOREIGN PATENT DOCUMENTS

| | | | |
|---|---|---|---|
| EP | 0686675 | | 2/1998 |
| EP | 1666546 | | 6/2006 |
| EP | 1710756 | | 10/2006 |
| EP | 2157141 | | 2/2010 |
| EP | 2402401 | | 1/2012 |
| EP | 2846932 | | 3/2018 |
| EP | 3423197 | | 1/2019 |
| WO | 2002073250 | | 9/2002 |
| WO | 2003000801 | | 1/2003 |
| WO | 2005002866 | | 1/2005 |
| WO | 2006063926 | | 6/2006 |
| WO | 2007131833 | | 11/2007 |
| WO | 2008046702 | | 4/2008 |
| WO | 2008139373 | | 11/2008 |
| WO | 2014108403 | | 7/2014 |
| WO | 2014108404 | | 7/2014 |
| WO | 2015082344 | | 6/2015 |
| WO | 2015086257 | | 6/2015 |
| WO | 2015092727 | | 6/2015 |
| WO | 2016026896 | | 2/2016 |
| WO | 2016083259 | | 6/2016 |
| WO | 2017/080698 | * | 5/2017 |
| WO | 2017/148789 | * | 8/2017 |
| WO | 2018019594 | | 2/2018 |
| WO | 2018033512 | | 2/2018 |
| WO | 2018054819 | | 3/2018 |
| WO | 2018141547 | | 8/2018 |

OTHER PUBLICATIONS

"Chemistry & Technology of UV & EB Formulation for Coatings, Inks & Paints", vol. IV, Formulation, by C. Lowe, G. Webster, S. Kessel and I. McDonald, 1996 by John Wiley & Sons in association with SITA Technology Limited.
"Chemistry & Technology of UV & EB Formulation for Coatings, Inks & Paints", vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.
Z.Q. Zhu and D. Howe (Halbach permanent magnet machines and applications: a review, IEE. Proc. Electric Power Appl., 2001, 148, p. 299-308.
Magnetic Materials, Fundamentals and Applications, 2nd Ed., Nicola A. Spaldin, p. 16-17, Cambridge University Press, 2011.
Martienssen, Handbook of Condensed Matter and Materials Data, Chap. 4.3.2, Soft Magnetic Materials, p. 758-793, and Chap. 4.3.4, Magnetic Oxides, p. 811-813, Springer 2005.
Wohlfarth, Ferromagnetic Materials, vol. 1, Iron, Cobalt and Nickel, p. 1-70, Elsevier 1999.
Chin et al., Ferromagnetic Materials, vol. 2, Chap. 2, Soft Magnetic Metallic Materials, p. 55-188, and Chap. 3, Ferrites for non-microwave Applications, p. 189-241, Elsevier 1999.
Electric and Magnetic Properties of Metals, C. Moosbrugger, Chap. 8, Magnetically Soft Materials, p. 196-209, ASM International, 2000.
Goldman, Handbook of modern Ferromagnetic Materials, Chap. 9, High-permeability High-frequency Metal Strip, p. 155-182, Kluwer Academic Publishers, 2002.
Brandes et al., Smithells Metals Reference Book, Chap. 20.3, Magnetically Soft Materials, p. 20-9-20-16, Butterworth-Heinemann Ltd, 1992.
International Search Report and Written Opinion issued with respect to application No. PCT/EP2020/079925.
Extended European Search Report issued with respect to European Patent Application No. 19205716.4.
China Patent Office Action in counterpart Chinese Application No. CN 202080075871.3 dated Oct. 30, 2023 (and English language translation of Office Action).

* cited by examiner

MAGNETIC ASSEMBLIES AND PROCESSES FOR PRODUCING OPTICAL EFFECT LAYERS COMPRISING ORIENTED NON-SPHERICAL MAGNETIC OR MAGNETIZABLE PIGMENT PARTICLES

FIELD OF THE INVENTION

The present invention relates to the field of the protection of value documents and value or branded commercial goods against counterfeit and illegal reproduction. In particular, the present invention relates to processes for producing optical effect layers (OELs) showing a viewing-angle dynamic appearance and optical effect layers obtained thereof, as well as to uses of said OELs as anti-counterfeit means on documents and articles.

BACKGROUND OF THE INVENTION

The use of inks, coating compositions, coatings, or layers, containing magnetic or magnetizable pigment particles, in particular non-spherical optically variable magnetic or magnetizable pigment particles, for the production of security elements and security documents is known in the art.

Security features for security documents and articles can be classified into "covert" and "overt" security features. The protection provided by covert security features relies on the concept that such features are hidden to the human senses, typically requiring specialized equipment and knowledge for their detection, whereas "overt" security features are easily detectable with the unaided human senses. Such features may be visible and/or detectable via the tactile senses while still being difficult to produce and/or to copy. However, the effectiveness of overt security features depends to a great extent on their easy recognition as a security feature, because users will only then actually perform a security check based on such security feature if they are aware of its existence and nature.

Coatings or layers comprising oriented magnetic or magnetizable pigment particles are disclosed for example in U.S. Pat. Nos. 2,570,856; 3,676,273; 3,791,864; 5,630,877 and 5,364,689. Magnetic or magnetizable pigment particles in coatings allow for the production of magnetically induced images, designs and/or patterns through the application of a corresponding magnetic field, causing a local orientation of the magnetic or magnetizable pigment particles in the unhardened coating, followed by hardening the latter to fix the particles in their positions and orientations. This results in specific optical effects, i.e. fixed magnetically induced images, designs or patterns which are highly resistant to counterfeiting. The security elements based on oriented magnetic or magnetizable pigment particles can only be produced by having access to both, the magnetic or magnetizable pigment particles or a corresponding ink or coating composition comprising said particles, and the particular technology employed for applying said ink or coating composition and for orienting said pigment particles in the applied ink or coating composition, followed by hardening said ink or composition.

A particularly striking optical effect can be achieved if a security feature changes its appearance upon a change in viewing conditions, such as the viewing angle. One example is the so-called "rolling bar" effect, as disclosed in US 2005/0106367 now U.S. Pat. No. 7,517,578. A "rolling bar" effect is based on pigment particles orientation imitating a curved surface across the coating. The observer sees a specular reflection zone which moves away or towards the observer as the image is tilted. This effect is nowadays utilized for a number of security elements on banknotes, such as on the "5" and the "10" of the 5 respectively 10 Euro banknote. Other examples of dynamic optical effects providing the impression of loop-shaped bodies such as rings are those disclosed in WO 2014/108403 A2 and WO 2014/108404 A2.

EP 2 846 932 B1 discloses optical effect layers (OELs) as well as devices and methods for producing said OELs. The disclosed OELs provides the optical impression of a pattern of bright areas and dark areas moving when a substrate comprising said OELs is tilted, said pattern of bright areas and dark areas moving in the same direction as the tilting direction.

A need remains for magnetic assemblies and processes for producing optical effect layers (OELs) based on magnetically oriented magnetic or magnetizable pigment particles in inks or coating compositions, wherein said magnetic assemblies and processes are reliable, easy to implement and able to work at a high production speed while allowing the production of OELs exhibiting a dynamic effect and being difficult to produce on a mass-scale with the equipment available to a counterfeiter.

SUMMARY OF THE INVENTION

Accordingly, it is an object of the present invention to provide magnetic assemblies (x00) for producing an optical effect layer (OEL) on a substrate (x20), said magnetic assembly (x00) being configured for receiving the substrate (x20) in an orientation at least partially parallel to a first plane (P) and further comprising:

a) a first magnetic-field generating device (x30) comprising at least four first dipole magnets (x31) having their magnetic axes oriented to be substantially perpendicular to the first plane (P),
   wherein each of the first dipole magnets (x31) is arranged on an intersection of at least two substantially parallel straight lines $\alpha_i$ (i=1, 2, . . . ) and at least two substantially parallel straight lines $\beta_j$ (j=1, 2, . . . ), the straight lines $\alpha_i$ and β forming a grid,
   wherein at least two first dipole magnets (x31) are disposed on one of the straight lines $\alpha_i$ and at least two other first dipole magnets (x31) are disposed on another one of the straight lines $\alpha_i$,
   wherein, on each straight line $\alpha_i$, and on each straight line $\beta_j$, neighboring first bar dipole magnets (x31) have their North pole pointing in an opposite direction and,
   wherein the first dipole magnets (x31) of said first magnetic-field generating device (x30) are partially or fully embedded in a first supporting matrix (x32); and
b) a second magnetic-field generating device (x40) comprising one or more second dipole magnets (x41) having their magnetic axes oriented to be substantially parallel to the first plane (P) and wherein the one or more second dipole magnets (x41) are partially or fully embedded in a second supporting matrix (x42);
   wherein the second magnetic-field generating device (x40) is disposed below the first magnetic-field generating device (x30), and
   wherein each straight line $\alpha_i$ and a vector sum H of the magnetic axes of the one or more second dipole magnets (x41) are substantially non-parallel and substantially non-perpendicular with respect to each other.

Also described herein are uses of the magnetic assembly (x00) described herein for producing the optical effect layer (OEL) on the substrate described herein.

Also described herein are printing apparatuses comprising a rotating magnetic cylinder comprising at least one of the magnetic assemblies (x00) described herein or a printing apparatus comprising a flatbed printing unit comprising at least one of the magnetic assemblies (x00 described herein.

Also described herein are processes for producing the optical effect layer (OEL) described herein on the substrate (x20) described herein, said processes comprising the steps of:

i) applying on a substrate (x20) surface a radiation curable coating composition comprising non-spherical magnetic or magnetizable pigment particles, said radiation curable coating composition being in a first state so as to form a coating layer (x10);

ii) exposing the radiation curable coating composition to a magnetic field of a static magnetic assembly (x00) described herein so as to orient at least a part of the non-spherical magnetic or magnetizable pigment particles;

iii) at least partially curing the radiation curable coating composition of step ii) to a second state so as to fix the non-spherical magnetic or magnetizable pigment particles in their adopted positions and orientations.

Also described herein are optical effect layers (OELs) produced by the process described herein.

Also described herein are methods of manufacturing a security document or a decorative element or object, comprising a) providing a security document or a decorative element or object, and b) providing an optical effect layer (OEL) such as those described herein, in particular such as those obtained by the process described herein, so that it is comprised by the security document or decorative element or object.

DETAILED DESCRIPTION

Definitions

The following definitions apply to the meaning of the terms employed in the description and recited in the claims.

As used herein, the indefinite article "a" indicates one as well as more than one, and does not necessarily limit its referent noun to the singular.

As used herein, the term "about" means that the amount or value in question may be the specific value designated or some other value in its neighborhood. Generally, the term "about" denoting a certain value is intended to denote a range within ±5% of that value. As one example, the phrase "about 100" denotes a range of 100±5, i.e. the range from 95 to 105. Generally, when the term "about" is used, it can be expected that similar results or effects according to the invention can be obtained within a range of ±5% of the indicated value.

The terms "substantially parallel"/"substantially non-parallel" refer to deviating not more than 100 from parallel alignment and the terms "substantially perpendicular"/"substantially non-perpendicular" refer to deviating not more than 100 from perpendicular alignment.

As used herein, the term "and/or" means that either both or only one of the elements linked by the term is present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance solution composition comprising a compound A may include other compounds besides A.

However, the term "comprising" also covers, as a particular embodiment thereof, the more restrictive meanings of "consisting essentially of" and "consisting of", so that for instance "a composition comprising A, B and optionally C" may also (essentially) consist of A and B, or (essentially) consist of A, B and C.

The term "coating composition" refers to any composition which is capable of forming a coating, in particular an optical effect layer (OEL) described herein, on a solid substrate, and which can be applied, preferably but not exclusively, by a printing method. The coating composition described herein comprises at least a plurality of non-spherical magnetic or magnetizable pigment particles and a binder.

The term "optical effect layer (OEL)" as used herein denotes a layer that comprises at least a plurality of magnetically oriented non-spherical magnetic or magnetizable pigment particles and a binder, wherein the non-spherical magnetic or magnetizable pigment particles are fixed or frozen (fixed/frozen) in position and orientation within said binder.

A "pigment particle", in the context of the present disclosure, designates a particulate material, which is insoluble in the ink or coating composition, and which provides the latter with specific spectral properties (e.g. opacity, color or colorshift).

Figure 5A:
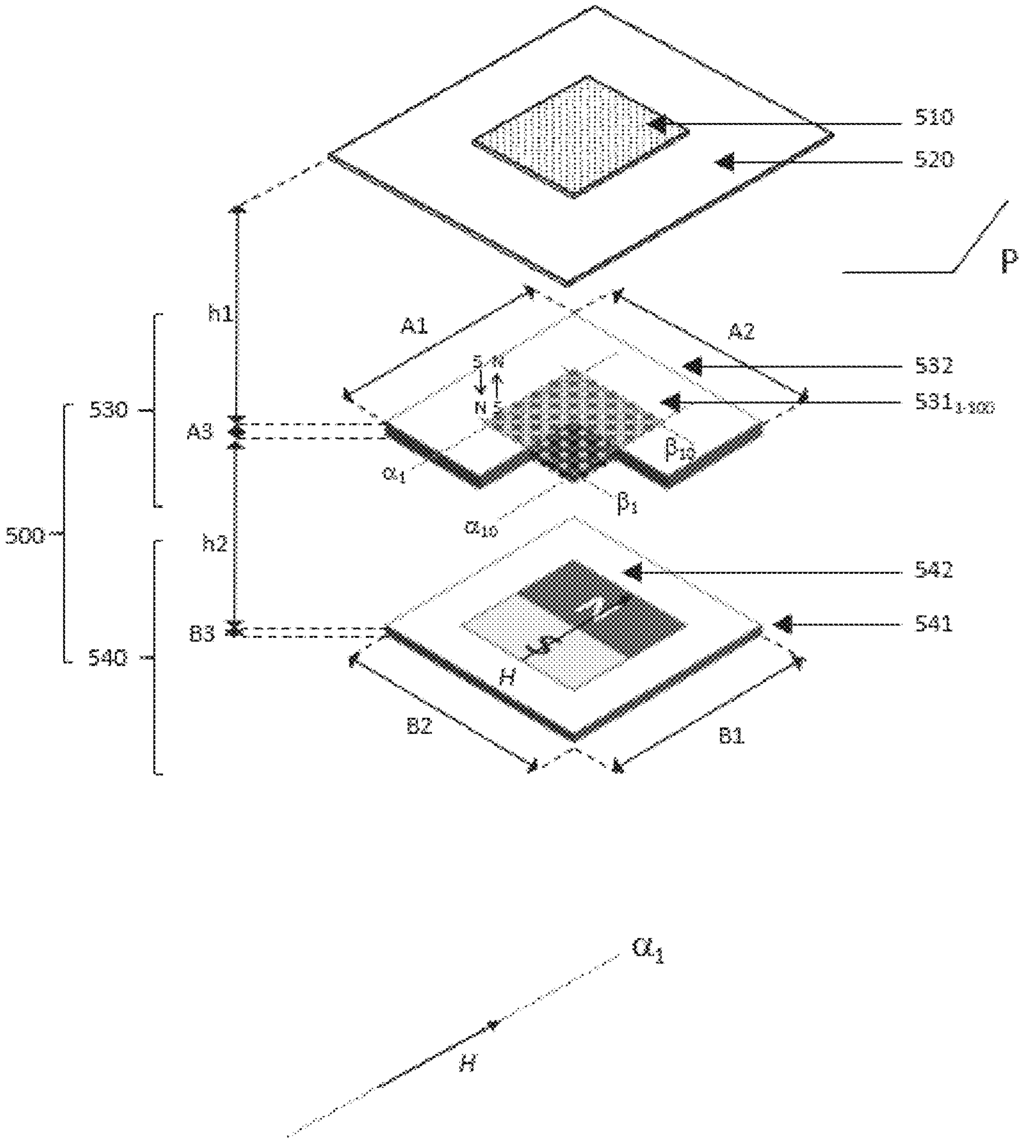
FIG. 5A-C schematically illustrates a magnetic assembly (500) for producing a comparative optical effect layer (OEL) on a substrate (520). The magnetic assembly (500) comprises a first magnetic-field generating device (530) comprising 100 first dipole magnets (531$_1$, . . . , 531$_{100}$) having their magnetic axes oriented to be substantially perpendicular to the substrate (520) surface and being embedded in a first supporting matrix (532); and a second magnetic-field generating device (540) comprising a second dipole magnet (541) having its magnetic axis substantially parallel to the substrate (520) and being embedded in a second supporting matrix (652), wherein each of the 100 first dipole magnets (531$_1$, . . . , 531$_{100}$), in particular the center of each of them, is arranged on the intersection of a grid comprising ten parallel straight lines $\alpha_i$ (i=1, . . . , 10; $\alpha_1$ to $\alpha_{10}$) and ten parallel straight lines $\beta_j$ (j=1, . . . , 10; $\beta_1$ to $\beta_{10}$), said straight lines $\alpha_i$ being perpendicular to the straight lines $\beta_j$. On each straight line $\alpha_i$ ($\alpha_1$ to $\alpha_{10}$) and on each straight line $\beta_j$ ($\beta_1$ to $\beta_{10}$), neighboring first bar dipole magnets (531) have their North pole pointing in an opposite direction, wherein on each straight line $\alpha_i$ ($\alpha$1 to $\alpha$10) and on each straight line $\beta_j$ ($\beta_1$ to $\beta_{10}$), the first dipole magnets are arranged in such as a way that their North and South polarity is alternating along said straight lines $\alpha_i$ and $\beta_j$. The first dipole magnets (531$_1$, . . . , 531$_{100}$) and the second dipole magnet (542) are arranged in such a way, that each straight line $\alpha_i$ and the sum vector H of the magnetic axis of the second dipole magnet (541) forms an angle $\gamma$ having a value of 0°, i.e. each straight line $\alpha_i$ and the sum vector H are parallel with respect to each other.
Figure 6A:
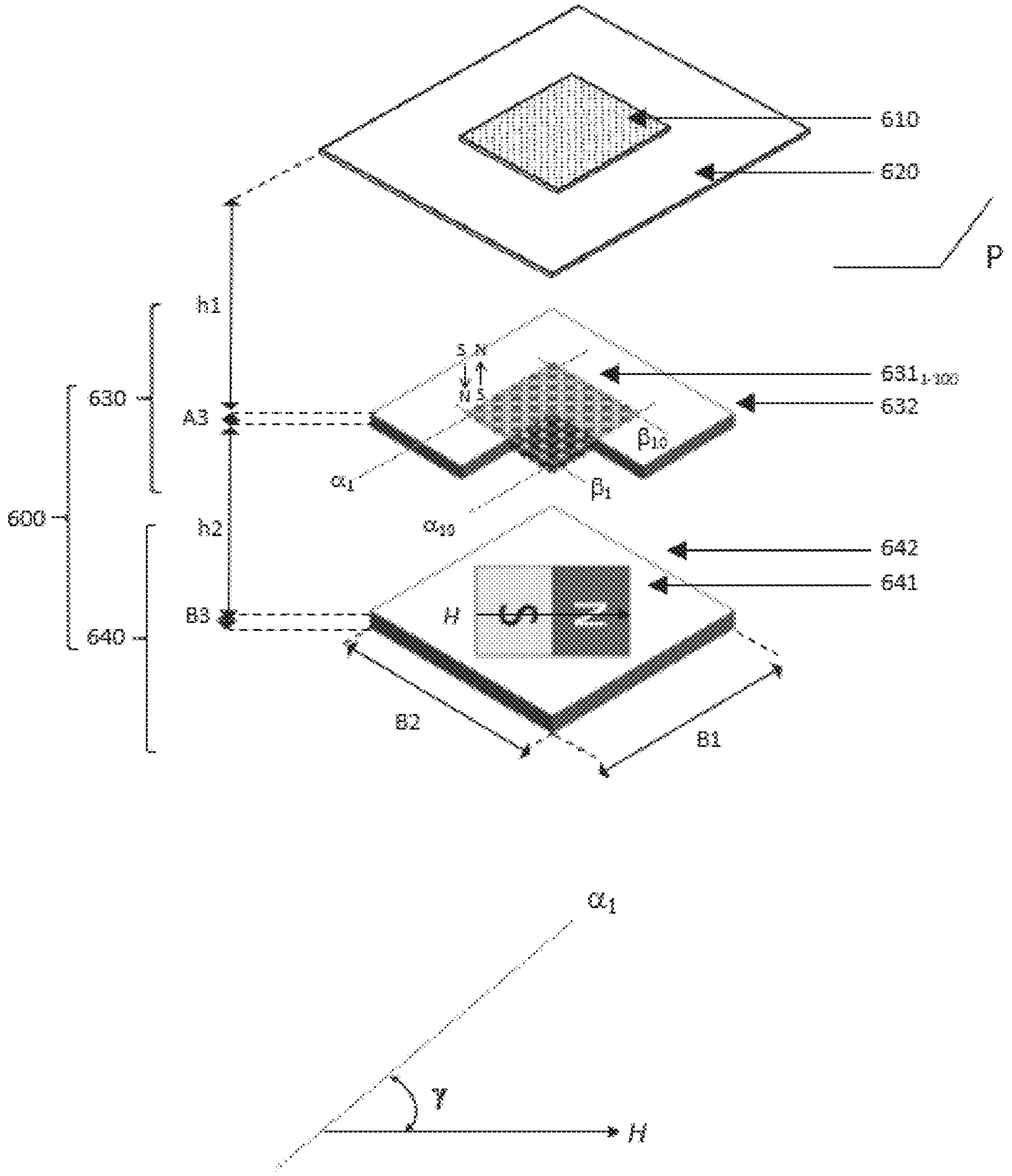
FIG. 6A-B schematically illustrates a magnetic assembly (600) for producing an optical effect layer (OEL) on a substrate (620). The magnetic assembly (600) comprises a first magnetic-field generating device (630) comprising 100 first dipole magnets (631$_1$, . . . , 631$_{100}$) having their magnetic axes oriented to be substantially perpendicular to the substrate (620) surface and being embedded in a first supporting matrix (632); and a second magnetic-field generating device (640) comprising a second dipole magnet (641) having its magnetic axis substantially parallel to the substrate (620) and being embedded in a second supporting matrix (642), wherein each of the 100 first dipole magnets (631$_1$, . . . , 631$_{100}$), in particular the center of each of them, is arranged on the intersection of a grid comprising ten lines $\alpha_i$ (i=1, . . . , 10; $\alpha_1$ to $\alpha_{10}$) and ten lines $\beta_j$ ($\beta_1$ to $\beta_{10}$), said straight lines $\alpha_i$ being perpendicular to the straight lines $\beta_j$. On each straight line $\alpha_i$ ($\alpha$1 to $\alpha_{10}$) and on each straight line $\beta_j$ (j=1, . . . , 19; $\beta_1$ to $\beta_{10}$), neighboring first bar dipole magnets (631) have their North pole pointing in an opposite direction, wherein on each straight line $\alpha_i$ ($\alpha_1$ to $\alpha_{10}$) and on each straight line $\beta_j$ ($\beta_1$ to $\beta_{10}$), the first dipole magnets are arranged in such as a way that their North and South polarity is alternating along said straight lines $\alpha_i$ and $\beta_j$. The first dipole magnets (631$_1$, . . . , 631$_{100}$) and the second dipole magnet (642) are arranged in such a way that each straight line $\alpha_i$ and the sum vector H of the magnetic axis of the second dipole magnet (641) of form an angle $\gamma$ having a value of 45°, i.e. each straight line $\alpha_i$ and the sum vector H are non-parallel and non-perpendicular with respect to each other.

In the context of the present invention, the term "magnetic axis" denotes a unit vector connecting the North pole (being denoted by a "N" and/or colored in dark grey) and the South pole (being denoted by a "S" and/or colored in light grey) of a magnet and going from the South pole to the North pole (Handbook of Physics, Springer 2002, page 463). In FIGS. 5A, 6A and 7, the magnetic axes of the second dipole magnets are illustrated by arrows having an end corresponding to the North pole.

In the context of the present invention, the term "vector sum" denotes a vector resulting from the addition of two or more magnetic axes, said addition obeying the rules of vector geometry.

As used herein, the term "at least" defines a determined quantity or more than said quantity, for example "at least one" means one, two or three, etc.

The term "security document" refers to a document which is protected against counterfeit or fraud by at least one security feature. Examples of security documents include, without limitation, currency, value documents, identity documents, etc.

The term "security feature" denotes an overt or a covert image, pattern, or graphic element that can be used for the authentication of the document or article carrying it.

Where the present description refers to "preferred" embodiments/features, combinations of these "preferred" embodiments/features shall also be deemed to be disclosed as preferred, as long as this combination of "preferred" embodiments/features is technically meaningful.

The present invention provides magnetic assemblies (x00) and processes using said magnetic assemblies (x00) for producing optical effect layers (OELs), said OELs comprising a plurality of non-randomly oriented non-spherical magnetic or magnetizable pigment particles, said pigment particles being dispersed within a hardened/cured material and optical effects layers (OELs) obtained thereof. Thanks to the orientation pattern of said magnetic or magnetizable pigment particle, the optical effect layer OEL described herein provides the optical impression of a plurality of dark spots and a plurality of bright spots moving and/or appearing and/or disappearing not only in a diagonal direction when the substrate carrying said OEL is tilted about a vertical/longitudinal axis but also moving and/or appearing and/or disappearing in a diagonal direction when the substrate carrying said OEL is tilted about a horizontal/latitudinal axis. In other words, the optical effect layer OEL described herein provides the optical impression of a plurality of dark and a plurality of bright spots that are moving, appearing and/or disappearing in two directions (longitudinal and latitudinal directions) when the substrate carrying said OEL is tilted about two perpendicular axes, i.e. horizontal/latitudinal axis and vertical/longitudinal axis.

The magnetic assemblies (x00) described herein allows the production of OELs on the substrate (x20) described herein wherein said magnetic assemblies (x00) are used for orienting the non-spherical magnetic or magnetizable pigment particles so as to produce the OEL described herein. The magnetic assemblies (x00) described herein are based on the interaction of at least a) the first magnetic-field generating device (x30) described herein and b) the second magnetic-field generating device (x40) described herein.

The second magnetic-field generating device (x40) is disposed below the first magnetic-field generating device (x30). In other words, during the process to produce the optical effect layer (OEL) described herein, the substrate (x20) carrying the coating layer (x10) comprising the non-spherical magnetic or magnetizable pigment particles is disposed on top of the first magnetic-field generating device (x30) and said first magnetic-field generating device (x30) is disposed on top of the second magnetic-field generating device (x40). Preferably, the first (x30) and the second (x40) magnetic-field generating device are substantially centered with respect to one another, i.e. the first magnetic-field generating device (x30) and the second magnetic-field generating device (x40) described herein are stacked, preferably coaxially arranged.

The magnetic assemblies (x00) described herein comprises the first magnetic-field generating device (x30) described herein, said first magnetic-field generating device (x30) comprising four or more first dipole magnets (x31) partially or fully embedded in the first supporting matrix (x32) described herein. As shown for example in FIG. 1-7, each of the first dipole magnets (x31), in particular the center ($C_{x31}$) of each of them, is arranged on the intersections of a grid, wherein said grid comprises at least two substantially parallel straight lines $\alpha_i$ and at least two substantially parallel straight line $\beta_j$, with i being 1, 2, etc. and j being 1, 2, etc. The grid described herein corresponds to a pattern of straight lines $\alpha_i$ and $\beta_j$ that cross over each other thus forming cells having the shape of squares, rectangles or parallelograms. According to one embodiment and as shown for example in FIG. 1-7, each of the first dipole magnets (x31), in particular the center ($C_{x31}$) of each of them, is arranged on the intersections of the grid and each of the intersections of said grid comprises a first dipole magnet (x31). According to another embodiment (not shown), each of the first dipole magnets (x31), in particular the center ($C_{x31}$) of each of them, is arranged on the intersections of the grid but some of the intersections of said grid do not comprise a first dipole magnet (x31).

At least two first dipole magnets (x31), in particular the center ($C_{x31}$) of each of them, are disposed on one of the substantially parallel straight lines $\alpha_i$ and at least two other first more dipole magnets (x31), in particular the center ($C_{x31}$) of each of them, are disposed on another one of the substantially parallel straight lines $\alpha_i$. In other words, there are at least two first dipole magnets (x31) on each straight line $\alpha_i$.

Since the first dipole magnets (x31), in particular the center ($C_{x31}$) of each of them, are disposed on the intersections of the grid comprising the at least two substantially parallel straight lines $\alpha_i$ and the at least two substantially parallel straight lines $\beta_j$ described herein and since the straight lines $\alpha_i$ cross the straight lines $\beta_j$, the first dipole magnets (x31), in particular the center ($C_{x31}$) of each of them, are also disposed on the straight lines $\beta_j$.

Figure 1A:
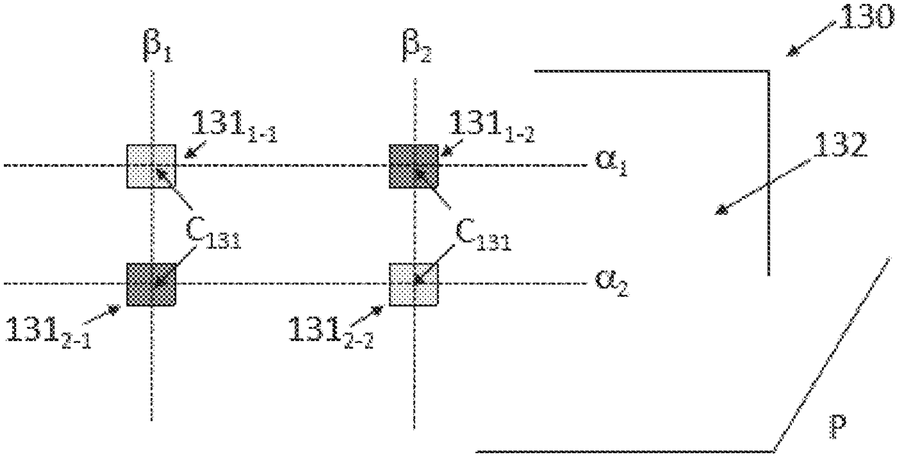
FIG. 1A-B schematically illustrate top views of first magnetic-field generating devices (130) comprising a first supporting matrix (132) and four first dipole magnets (131$_{1-1}$, 131$_{1-2}$, 131$_{2-1}$, 131$_{2-2}$), wherein each of said four first dipole magnets (131$_{i-j}$: 131$_{1-1}$, 131$_{1-2}$, 131$_{2-1}$, 131$_{2-2}$), in particular the center ($C_{131}$) of each of them, is arranged on the intersection of a grid comprising two substantially parallel straight lines $\alpha_i$ (i=1 and 2; $\alpha_1$ and $\alpha_2$) and two substantially parallel straight lines $\beta_j$ (j=1 and 2; $\beta_1$ and $\beta_2$); wherein the straight lines $\alpha_i$ are either substantially perpendicular to the straight lines $\beta_j$ (FIG. 1A) or substantially not perpendicular to the straight lines $\beta_j$ (FIG. 1B). The four first dipole magnets (131$_{1-1}$, 131$_{1-2}$, 131$_{2-1}$, 131$_{2-2}$) have their magnetic axes oriented to be substantially perpendicular to the first plane (P) (substantially perpendicular to the substrate during the process described herein), wherein, on each straight line $\alpha_i$, and on each straight line $\beta_j$, neighboring first bar dipole magnets (131) have their North pole pointing in an opposite direction (as illustrated by the colors dark grey (North pole) and light grey (South pole)).
Figure 1B:
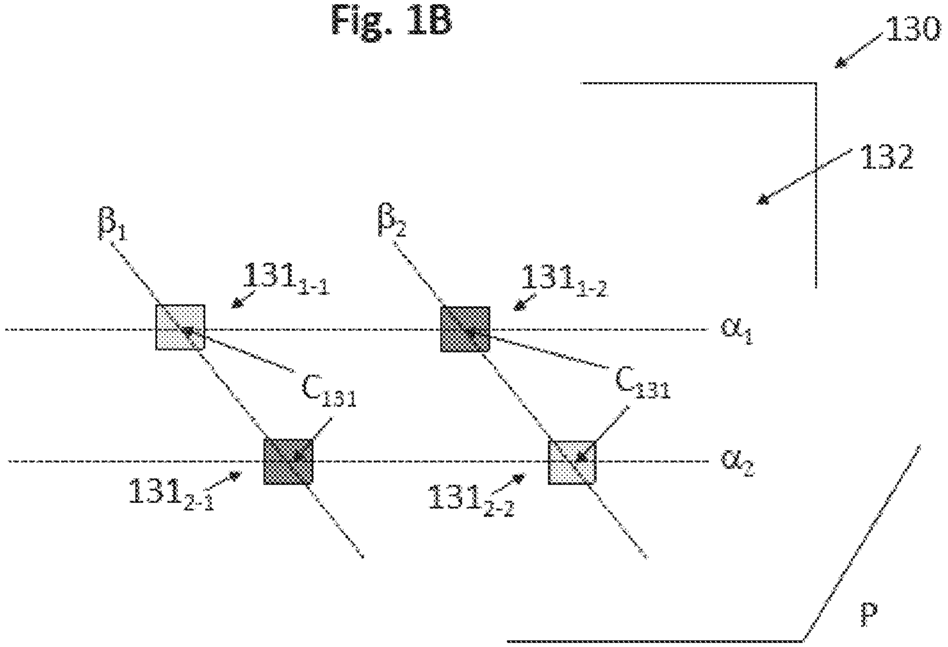
Figure 2A:
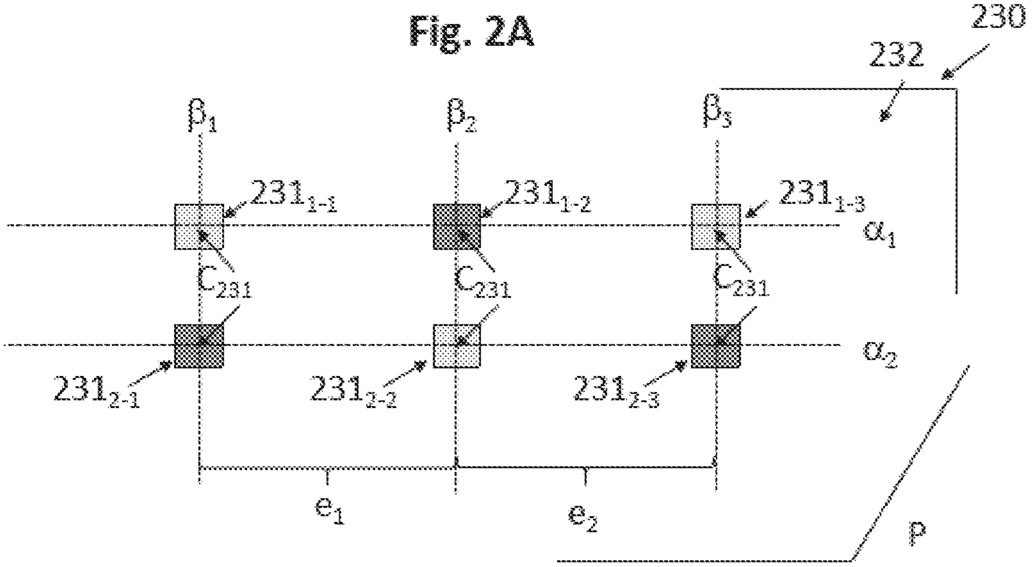
FIG. 2A-B schematically illustrate top views of first magnetic-field generating devices (230) comprising a first supporting matrix (232) and six first dipole magnets (231$_{i-j}$: 231$_{1-1}$, 231$_{1-2}$, 231$_{1-3}$, 231$_{2-1}$, 231$_{2-1}$, 231$_{2-3}$), wherein each of said six first dipole magnets (231), in particular the center ($C_{231}$) of each of them, is arranged on the intersection of a grid comprising two substantially parallel straight lines $\alpha_i$ (i=1 and 2; $\alpha_1$ and $\alpha_2$) and three substantially parallel straight lines $\beta_j$ (j=1, 2 and 3; $\beta_1$, $\beta_2$ and $\beta_3$); wherein the straight lines $\alpha_i$ are either substantially perpendicular to the straight lines $\beta_j$ (FIG. 2A) or substantially not perpendicular to the straight lines $\beta_j$ (FIG. 2B). The six first dipole (231$_{1-1}$, 231$_{1-2}$, 231$_{1-3}$, 231$_{2-1}$, 231$_{2-1}$, 231$_{2-3}$) have their magnetic axes oriented to be substantially perpendicular to the first plane (P) (substantially perpendicular to the substrate during the process described herein), wherein, on each straight line $\alpha_i$, and on each straight line $\beta_j$, neighboring first bar dipole magnets (231) have their North pole pointing in an opposite direction (as illustrated by the colors dark grey (North pole) and light grey (South pole)), and wherein on each straight line $\alpha_i$, the first dipole magnets are arranged in such as a way that their North and South polarity is alternating along said straight lines $\alpha_i$.
Figure 2B:
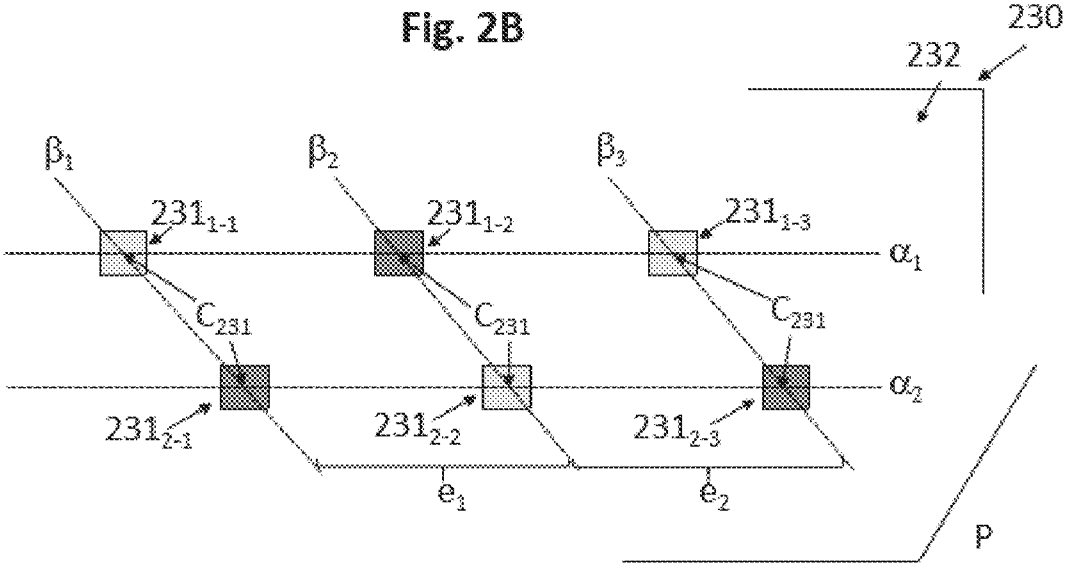
Figure 3A:
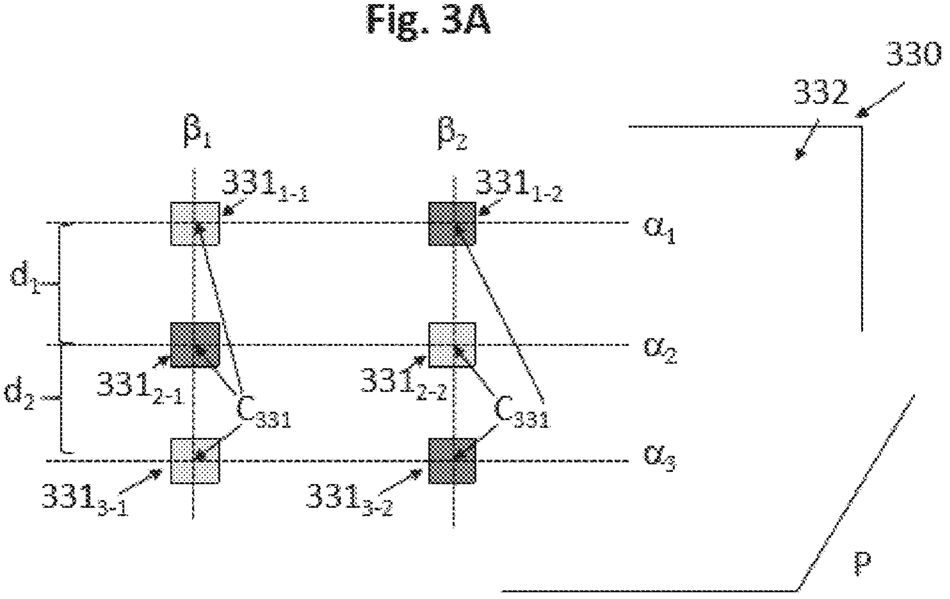
FIG. 3A-B schematically illustrate top views of first magnetic-field generating devices (330) comprising a first supporting matrix (332) and six first dipole magnets (331$_{i-j}$: 331$_{1-1}$, 331$_{1-2}$, 331$_{2-1}$, 331$_{2-2}$, 331$_{3-1}$, 331$_{3-2}$), wherein each of said six first dipole magnets (331), in particular the center ($C_{331}$) of each of them, is arranged on the intersection of a grid comprising of three substantially parallel straight lines $\alpha_i$ (i=1, 2 and 3; $\alpha_1$, $\alpha_2$ and $\alpha_3$) and two substantially parallel straight lines $\beta_j$ (j=1 and 2) $\beta_1$ and $\beta_2$); wherein the straight lines $\alpha_i$ are either substantially perpendicular to the straight lines $\beta_j$ (FIG. 3A) or substantially not perpendicular to the straight lines $\beta_j$ (FIG. 3B). The six first (331$_{1-1}$, 331$_{1-2}$, 331$_{2-1}$, 331$_{2-2}$, 331$_{3-1}$, 331$_{3-2}$) have their magnetic axes oriented to be substantially perpendicular to the first plane (P) (substantially perpendicular to the substrate during the process described herein), wherein, on each straight line $\alpha_i$, and on each straight line $\beta_j$, neighboring first bar dipole magnets (331) have their North pole pointing in an opposite direction (as illustrated by the colors dark grey (North pole) and light grey (South pole)), and wherein on each straight line $\beta_j$, the first dipole magnets are arranged in such as a way that their North and South polarity is alternating along said straight lines $\beta_j$.
Figure 3B:
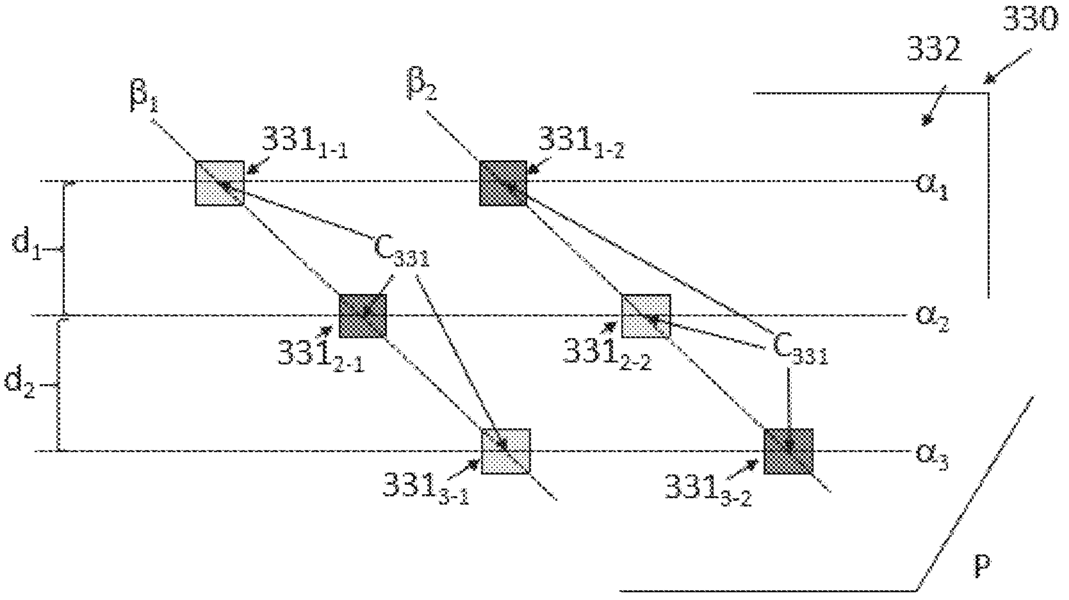
Figure 4A:
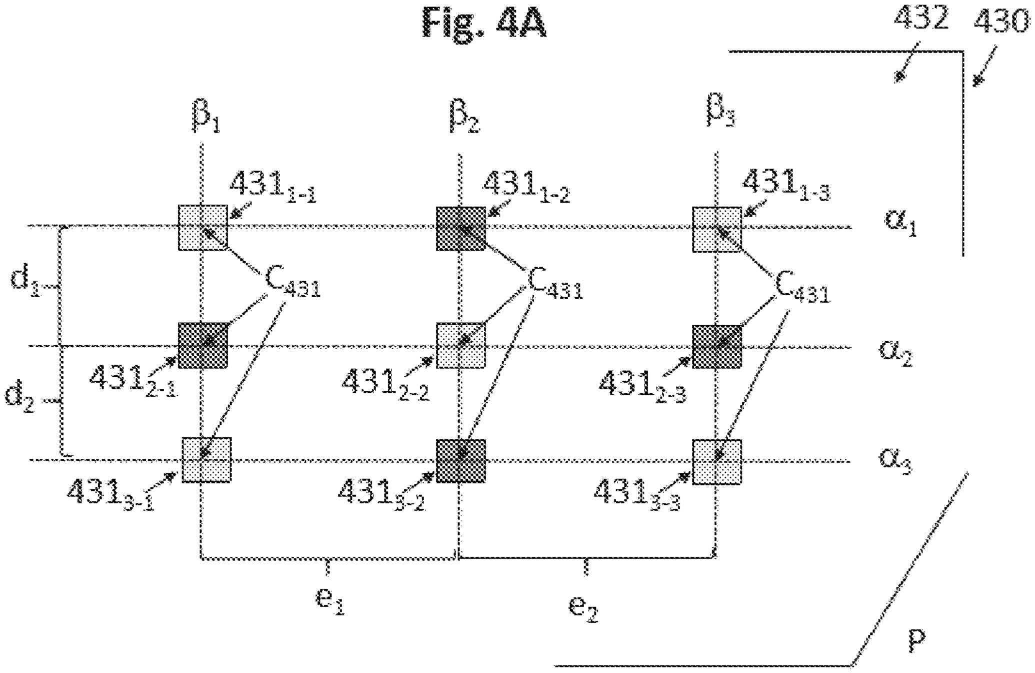
FIG. 4A-B schematically illustrate top views of first magnetic-field generating devices (430) comprising a first supporting matrix (432) and nine first dipole magnets (431$_{i-j}$: 431$_{1-1}$, 431$_{1-2}$, 431$_{1-3}$, 431$_{2-1}$, 431$_{2-2}$, 431$_{2-3}$, 431$_{3-1}$, 431$_{3-2}$, 431$_{3-3}$), wherein each of said nine first dipole magnets (431), in particular the center ($C_{431}$) of each of them, is arranged on the intersections of a grid comprising three substantially parallel straight lines $\alpha_i$ (i=1, 2 and 3; $\alpha_1$, $\alpha_2$ and $\alpha_3$) and three substantially parallel straight lines $\beta_j$ (j=1, 2 and 3; $\beta_1$, $\beta_2$ and $\beta_3$); wherein the straight lines $\alpha_i$ are substantially perpendicular to the straight lines $\beta_j$ (FIG. 4A) or substantially not perpendicular to the straight lines $\beta_j$ (FIG. 4B). The nine first dipole magnets (431$_{1-1}$, 431$_{1-2}$, 431$_{1-3}$, 431$_{2-1}$, 431$_{2-2}$, 431$_{2-3}$, 431$_{3-1}$, 431$_{3-2}$, 431$_{3-3}$) have their magnetic axes oriented to be substantially perpendicular to the first plane (P) (substantially perpendicular to the substrate during the process described herein), wherein, on each straight line $\alpha_i$, and on each straight line $\beta_j$, neighboring first bar dipole magnets (431) have their North pole pointing in an opposite direction (as illustrated by the colors dark grey (North pole) and light grey (South pole)), wherein on each straight line $\alpha_i$, the first dipole magnets are arranged in such as a way that their North and South polarity is alternating along said straight lines $\alpha_i$ and wherein wherein on each straight line $\beta_j$, the first dipole magnets are arranged in such as a way that their North and South polarity is alternating along said straight lines $\beta_j$.
Figure 4B:
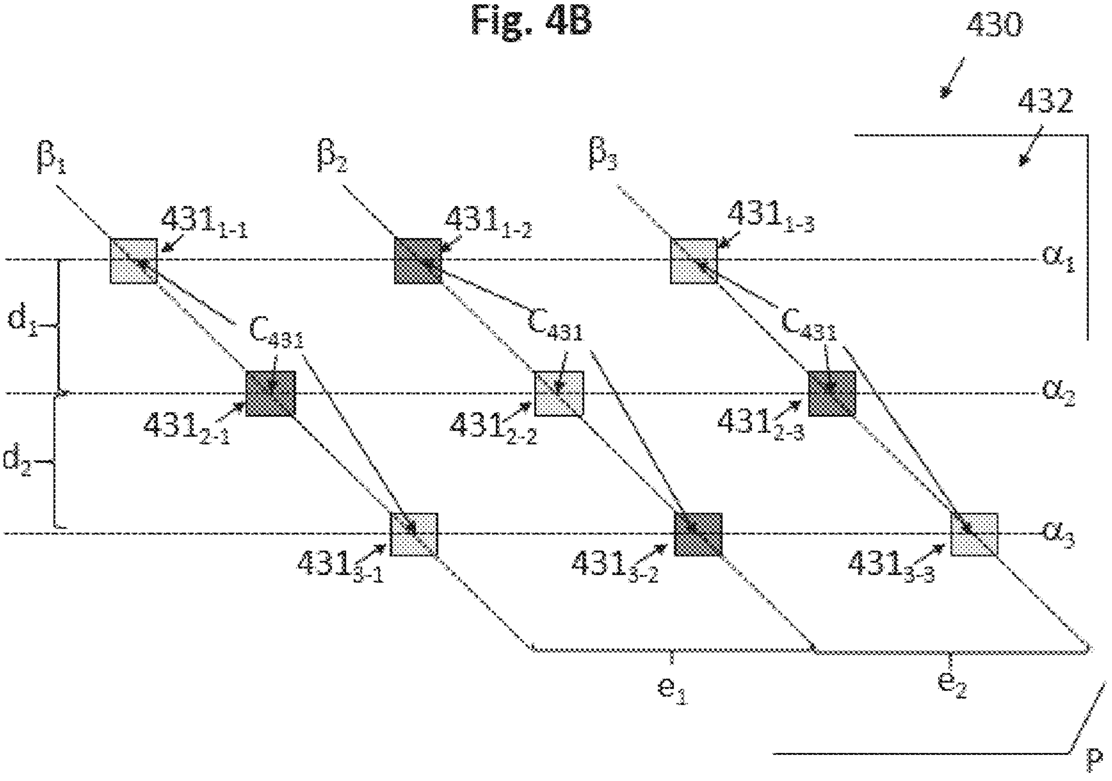

In FIG. 1A-B, the first magnetic-field generating device (130) comprises four first dipole magnets ($\mathbf{131}_{1\text{-}1}$, $\mathbf{131}_{1\text{-}2}$, $\mathbf{131}_{2\text{-}1}$, $\mathbf{131}_{2\text{-}2}$) embedded in the first supporting matrix (132), wherein said first dipole magnets (131$_{1-1}$, 131$_{1-2}$, 131$_{2-1}$, 131$_{2-2}$) are disposed on the intersections of a grid comprising two substantially parallel straight lines $\alpha_i$ ($\alpha_1$ and $\alpha_2$) and two substantially parallel straight lines $\beta_j$ ($\beta_1$ and $\beta_2$). In FIG. 2A-B, the first magnetic-field generating devices (230) comprises six first dipole magnets (231$_{1-1}$, 231$_{1-2}$, 231$_{1-3}$, 231$_{2-1}$, 231$_{2-1}$, 231$_{2-3}$) embedded in the first supporting matrix (232), wherein said first dipole magnets (231$_{1-1}$, 231$_{1-2}$, 231$_{1-3}$, 231$_{2-1}$, 231$_{2-2}$, 231$_{2-3}$) are disposed on the intersections of a grid comprising two substantially parallel straight lines $\alpha_i$ ($\alpha_1$ and $\alpha_2$) and three substantially parallel straight lines $\beta_j$ ($\beta_1$, $\beta_2$ and $\beta_3$). In FIG. 3A-B, the first magnetic-field generating device (330) comprises six first dipole magnets (331$_{1-1}$, 331$_{1-2}$, 331$_{2-1}$, 331$_{2-2}$, 331$_{3-1}$, 331$_{3-2}$) embedded in the first supporting matrix (332), wherein said dipole magnets (331$_{1-1}$, 331$_{1-2}$, 331$_{2-1}$, 331$_{2-2}$, 331$_{3-1}$, 331$_{3-2}$) are disposed on the intersections of a grid comprising three substantially parallel straight lines $\alpha_i$ ($\alpha_1$, $\alpha_2$ and $\beta_3$) and two substantially parallel straight lines $\beta_j$ ($\beta_1$ and $\beta_2$). In FIG. 4A-B, the first magnetic-field generating device (430) comprises nine first dipole magnets (431$_{1-1}$, 431$_{1-2}$, 431$_{1-3}$, 431$_{2-1}$, 431$_{2-2}$, 431$_{2-3}$, 431$_{3-1}$, 431$_{3-2}$, 431$_{3-3}$) embedded in the first supporting matrix (432), wherein said first dipole magnets (431$_{1-1}$, 431$_{1-2}$, 431$_{1-3}$, 431$_{2-1}$, 431$_{2-2}$, 431$_{2-3}$, 431$_{3-1}$, 431$_{3-2}$, 431$_{3-3}$) are disposed on the intersections of a grid comprising three substantially parallel straight lines $\alpha_i$ ($\alpha_1$, $\alpha_2$ and $\alpha_3$) and three substantially parallel straight lines $\beta_j$ ($\beta_1$, $\beta_2$ and $\beta_3$).

The substantially parallel straight lines $\alpha_i$ are substantially parallel with respect to each other and the substantially parallel straight lines $\beta_j$ are substantially parallel with respect to each other. According to one embodiment shown for example in FIGS. 1A, 2A, 3A, 4A, 5A-B, 6A and 7, said straight lines $\alpha_i$ are substantially perpendicular to said straight lines $\beta_2$, i.e. the angle formed between the straight lines $\alpha_i$ and the straight lines $\beta_j$ is 90° thus forming a grid comprising cells having the shape of squares or rectangles. According to another embodiment shown for example in FIGS. 1B, 2B, 3B and 4B, said straight lines $\alpha_i$ are substantially not perpendicular to said straight lines $\beta_j$, i.e. the angle formed between the straight lines $\alpha_i$ and the straight lines $\beta_j$ is not 90° thus forming a grid comprising cells having the shape of parallelograms.

According to one embodiment shown for example in FIG. 1A-B wherein at least four first dipole magnets (x31) are comprised in the first magnetic-field generating device (x30), each of the first dipole magnets (x31), in particular the center ($C_{x31}$) of each of them, is arranged on the intersection of at least two substantially parallel straight lines $\alpha_i$ ($\alpha_1$ and $\alpha_2$) and at least two substantially parallel straight lines $\beta_j$ ($\beta_1$ and $\beta_2$), the straight lines $\alpha_i$ being substantially parallel with respect to each other, the straight lines $\beta_j$ being substantially parallel with respect to each other and the substantially parallel straight lines $\alpha_i$ and $\beta_j$ forming the grid (i.e. a grid comprising two substantially parallel straight lines $\alpha_i$ ($\alpha_1$ and $\alpha_2$) and two substantially parallel straight lines $\beta_j$ ($\beta_1$ and $\beta_2$)). At least two first dipole magnets (x31), in particular the center ($C_{x31}$) of each of them, are disposed on one of the straight lines $\alpha_i$ ($\alpha_1$) and at least two other first dipole magnets (x31) are disposed on another one of the straight lines $\alpha_i$ ($\alpha_2$).

According to another embodiment shown for example in FIG. 2A-B wherein at least six first dipole magnets (x31) are comprised in the first magnetic-field generating device (x30), each of the first dipole magnets (x31), in particular the center ($C_{x31}$) of each of them, is arranged on the intersection of at least two substantially parallel straight lines $\alpha_i$ ($\alpha_1$ and $\alpha_2$) and at least three substantially parallel straight lines $\beta_j$ ($\beta_1$, $\beta_2$ and $\beta_3$), the straight lines $\alpha_i$ and $\beta_j$ forming the grid (i.e. a grid comprising two substantially parallel straight lines $\alpha_i$ ($\alpha_1$ and $\alpha_2$) and three substantially parallel straight lines $\beta_j$ ($\beta_1$ and $\beta_2$)). At least three dipole magnets (x31), in particular the center ($C_{x31}$) of each of them, are disposed on one of the straight lines $\alpha_i$ ($\alpha_1$), at least three other first dipole magnets (x31) are disposed on another one of the straight lines $\alpha_i$ ($\alpha_2$).

According to another embodiment shown for example in FIG. 3A-B wherein at least six first dipole magnets (x31) are comprised in the first magnetic-field generating device (x30), each of the first dipole magnets (x31), in particular the center ($C_{x31}$) of each of them, is arranged on the intersection of at least three substantially parallel straight lines $\alpha_i$ ($\alpha_1$, $\alpha_2$ and $\alpha_3$) and at least two substantially parallel straight lines $\beta_j$ ($\beta_1$ and $\beta_2$), the straight lines $\alpha_i$ and $\beta_j$ forming the grid (i.e. a grid comprising three substantially parallel straight lines $\alpha_i$ ($\alpha_1$, $\alpha_2$ and $\alpha_3$) and two substantially parallel straight lines $\beta_j$ ($\beta_1$ and $\beta_2$)). At least two first dipole magnets (x31), in particular the center ($C_{x31}$) of each of them, are disposed on one of the straight lines $\alpha_i$ ($\alpha_1$), at least two other first dipole magnets (x31) are disposed on another one of the straight lines $\alpha_i$ ($\alpha_2$) and at least two other first dipole magnets (x31) are disposed on a further other one of the straight lines $\alpha_i$ ($\alpha_3$).

According to another embodiment shown for example in FIG. 4A-B wherein at least nine first dipole magnets (x31) are comprised in the first magnetic-field generating device (x30), each of the first dipole magnets (x31), in particular the center ($C_{x31}$) of each of them, is arranged on the intersection of at least three substantially parallel straight lines $\alpha_i$ ($\alpha_1$, $\alpha_2$ and $\alpha_3$) and at least three substantially parallel straight lines $\beta_j$ ($\beta_1$, $\beta_2$ and $\beta_3$), the straight lines $\alpha_i$ and $\beta_j$ forming the grid (i.e. a grid comprising three substantially parallel straight lines $\alpha_i$ ($\alpha_1$, $\alpha_2$ and $\alpha_3$) and three substantially parallel straight lines $\beta_j$ ($\beta_1$, $\beta_2$ and $\beta_3$). At least three first dipole magnets (x31), in particular the center ($C_{x31}$) of each of them, are disposed on one of the straight lines $\alpha_i$ ($\alpha_1$), at least three other first dipole magnets (x31) are disposed on another one of the straight lines $\alpha_i$ ($\alpha_2$) and at least three other first dipole magnets (x31) are disposed on a further other one of the straight lines $\alpha_i$ ($\alpha_3$).

When the grid comprises more than two substantially parallel straight lines $\alpha_i$, the distance between neighboring lines $\alpha_i$ may be the same or may be different. In FIGS. 3A-B and 4A-B, the distances d1 and d2 between neighboring lines $\alpha_i$ (i.e. the distance d1 between $\alpha_1$ and $\alpha_2$ and the distance d2 between $\alpha_2$ and $\alpha_3$) may have the same value or may have different values.

When the grid comprises more than two substantially parallel straight lines $\beta_j$, the distance between neighboring lines $\beta_j$ may be the same or may be different. In FIGS. 2A-B and 4A-B, the distances e1 and e2 between neighboring lines $\beta_j$ (i.e. the distance e1 between $\beta_1$ and $\beta_2$ and the distance e2 between $\beta_2$ and $\beta_3$) may have the same value or may have different values.

The distance between two substantially parallel straight lines $\alpha_i$ and the distance between two substantially parallel straight lines $\beta_j$ may be the same or may be different.

On each parallel straight line $\alpha_i$ and/or on each parallel straight line $\beta_j$, the first dipole magnets (x31) described herein may be adjacent or may be spaced apart from each other (i.e. they are not adjacent). For embodiments with first dipole magnets (x31) being spaced apart, each of the first dipole magnet is separated from its/their respective neighboring magnets by a gap, i.e. by a distance bigger than 0, preferably between about 0.1 mm and 10 mm and more preferably between about 0.2 mm and 6 mm.

All the first dipole magnets (x31) of the first magnetic-field generating device (x30) described herein have their magnetic axes oriented to be substantially perpendicular to the first plane (P) (i.e. have their magnetic axes oriented to be substantially perpendicular to the substrate (x20) surface when the magnetic assembly (x00) is used for the process described herein).

As shown for example in FIG. 1A-B, on each straight line $\alpha_i$ and on each straight line $\beta_j$, neighboring first bar dipole magnets (x31) have their North pole pointing in an opposite direction. In other words, on each straight line $\alpha_i$ and on each straight line $\beta_j$, the North pole of each first bar dipole magnet (x31) is pointing in the opposite direction as the North pole of its/their respective neighbouring magnets. In FIG. 1A-B, the first magnetic-field generating device (x30) comprises four first dipole magnets (x31) arranged, in particular have their respective center ($C_{x31}$) arranged, on the intersections of a grid comprising two substantially parallel straight lines $\alpha_i$ ($\alpha_1$ and $\alpha_2$) and two substantially parallel straight lines $\beta_j$ ($\beta_1$ and $\beta_2$), wherein the straight lines $\alpha_i$ ($\alpha_1$ and $\alpha_2$) are either substantially perpendicular to the straight lines $\beta_j$ ($\beta_1$ and $\beta_2$) (see FIG. 1A) or substantially not perpendicular to the straight lines $\beta_j$ ($\beta_1$ and $\beta_2$) (see FIG. 1B). The four first dipole magnets (x31) have their magnetic axes oriented to be substantially perpendicular to the first plane (P) (i.e. substantially perpendicular to the substrate (x20) surface) in such a way that, along the straight lines $\alpha_1$ and $\alpha_2$, and along the straight lines $\beta_1$ and $\beta_2$, neighboring first bar dipole magnets (x31) have their North pole pointing in an opposite direction. The first dipole magnets (131$_{1-1}$ and 131$_{1-2}$) are disposed on the first straight line $\alpha_1$ and the first dipole magnets (131$_{2-1}$ and 131$_{2-2}$) are disposed on the second straight line $\alpha_2$. The first dipole magnet (131$_{1-1}$) has its South pole pointing towards the substrate surface during the process to produce the optical effect layer (OEL) described herein and the second first dipole magnets (131$_{1-2}$) has its North pole pointing towards the substrate surface. The first dipole magnet (131$_{2-1}$) has its North pole pointing towards the substrate surface and the second first dipole magnets (131$_{2-2}$) has its South pole pointing towards the substrate surface.

For embodiments wherein the first magnetic-field generating device (x30) comprises more than two first dipole magnets (x31) on a straight line $\alpha_i$ and/or on a straight line $\beta_j$, each first bar dipole magnet (x31) has its North pole pointing in the opposite direction as the North pole of its/their respective neighbouring magnets. In other words, the first dipole magnets (x31) are arranged in such as a way that their North and South polarity is alternating along the straight lines $\alpha_i$ and along the straight lines $\beta_j$, i.e. the South-North magnetic direction of two neighboring first dipole magnets along the straight lines $\alpha_i$ and along the straight lines $\beta_j$ are opposite.

As shown for example in FIG. 2A-B, on each straight line $\alpha_i$ and on each straight line $\beta_j$, neighboring first bar dipole magnets (x31) have their North pole pointing in an opposite direction and, on each straight line $\alpha_i$, the first dipole magnets (x31) are arranged in such as a way that their North and South polarity is alternating along said straight lines $\alpha_i$. In FIG. 2A-B, the first magnetic-field generating device (x30) comprises six first dipole magnets (x31) arranged, in particular have their respective center ($C_{x31}$) arranged, on the intersections of two substantially parallel straight lines $\alpha_i$ ($\alpha_1$ and $\alpha_2$) and three substantially parallel straight lines $\beta_j$ ($\beta_1$, $\beta_2$ and $\beta_3$), wherein the straight lines $\alpha_i$ ($\alpha_1$ and $\alpha_2$) are either substantially perpendicular to the straight lines $\beta_j$ ($\beta_1$, $\beta_2$ and $\beta_3$) (see FIG. 2A) or substantially not perpendicular to the straight lines $\beta_j$ ($\beta_1$, $\beta_2$ and $\beta_3$) (see FIG. 2B). The six first dipole magnets (x31) have their magnetic axes oriented to be substantially perpendicular to the first plane (P) (i.e. substantially perpendicular to the substrate (x20) surface). The first dipole magnets (231$_{1-1}$, 231$_{1-2}$ and 231$_{1-3}$) are disposed on the first straight line $\alpha_1$ and the first dipole magnets (231$_{2-1}$, 231$_{2-2}$ and 231$_{2-3}$) are disposed on the second straight line $\alpha_2$. The first dipole magnet (231$_{1-1}$) has its South pole pointing towards the substrate surface during the process to produce the optical effect layer (OEL) described herein, the second first dipole magnets (231$_{1-2}$) has its North pole pointing towards the substrate surface and the third first dipole magnet (231$_{1-3}$) has its South pole pointing towards the towards the substrate surface. The first dipole magnet (231$_{2-1}$) has its North pole pointing towards the substrate surface, the second first dipole magnets (231$_{2-2}$) has its South pole pointing towards the substrate surface and the third first dipole magnet (231$_{2-3}$) has its North pole pointing towards the substrate surface. The first dipole magnets (x31) shown in FIG. 2A-B are arranged in such as a way that their North and South polarity is alternating along the two straight lines $\alpha_i$ ($\alpha_1$ and $\alpha_2$) and along the three straight lines $\beta_j$ ($\beta_1$, $\beta_2$ and $\beta_3$), i.e. the South-North magnetic direction of two neighboring first dipole magnets along the straight lines $\alpha_i$ ($\alpha_1$ and $\alpha_2$) and along the straight lines $\beta_j$ ($\beta_1$, $\beta_2$ and $\beta_3$) are opposite.

As shown for example in FIG. 3A-B, on each straight line $\alpha_i$ and on each straight line $\beta_j$, neighboring first bar dipole magnets (x31) have their North pole pointing in an opposite direction and, on each straight line $\beta_j$, the first dipole magnets (x31) are arranged in such as a way that their North and South polarity is alternating along said straight lines $\beta_j$. In FIG. 3A-B, the first magnetic-field generating device (x30) comprises six first dipole magnets (x31) arranged, in particular have their respective center ($C_{x31}$) arranged, on the intersections of three substantially parallel straight lines $\alpha_i$ ($\alpha_1$, $\alpha_2$ and $\alpha_3$) and two substantially parallel straight lines $\beta_j$ ($\beta_1$ and $\beta_2$), wherein the straight lines $\alpha_i$ ($\alpha_1$, $\alpha_2$ and $\alpha_3$) are either perpendicular to the straight lines $\beta_j$ ($\beta_1$ and $\beta_2$) (see FIG. 3A) or not perpendicular to the straight lines $\beta_j$ ($\beta_1$ and $\beta_2$) (see FIG. 3B). The six first dipole magnets (x31) have their magnetic axes oriented to be substantially perpendicular to the first plane (P) (i.e. substantially perpendicular to the substrate (x20) surface). The first dipole magnets (331$_{1-1}$ and 331$_{1-2}$) are disposed on the first straight line $\alpha_1$, the first dipole magnets (331$_{2-1}$ and 331$_{2-2}$) are disposed on the second straight line $\alpha_2$ and the first dipole magnets (331$_{3-1}$ and 331$_{3-2}$) are disposed on the third straight line $\alpha_3$. The first dipole magnet (331$_{1-1}$) has its South pole pointing towards the substrate surface during the process to produce the optical effect layer (OEL) described herein and the second first dipole magnets (331$_{1-2}$) has its North pole pointing towards the substrate surface. The first dipole magnet (331$_{2-1}$) has its North pole pointing towards the substrate surface and the second first dipole magnets (331$_{2-2}$) has its South pole pointing towards the substrate surface. The first dipole magnet (331$_{3-1}$) has its South pole pointing towards the substrate surface and the second first dipole magnets (331$_{3-2}$) has its North pole pointing towards the substrate surface. The first dipole magnets (x31) shown in FIG. 3A-B are arranged in such as a way that their North and South polarity is alternating along the three straight lines $\alpha_i$ ($\alpha_1$, $\alpha_2$ and $\alpha_3$) and along the two straight lines $\beta_j$ ($\beta_1$ and $\beta_2$), i.e. the South-North magnetic direction of two neighboring first dipole magnets along the straight lines $\alpha_i$ ($\alpha_1$ and $\alpha_2$) and along the straight lines $\beta_j$ ($\beta_1$ and $\beta_2$) are opposite.

As shown for example in FIG. 4A-B, on each straight line $\alpha_i$ and on each straight line $\beta_j$, neighboring first bar dipole magnets (x31) have their North pole pointing in an opposite direction and, on each straight line $\alpha_i$ and on each straight line $\beta_j$, the first dipole magnets (x31) are arranged in such as a way that their North and South polarity is alternating along said straight lines $\alpha_i$ and $\beta_j$. In FIG. 4A-B, the first magnetic-field generating device (x30) comprises nine first dipole magnets (x31) arranged, in particular have their respective center ($C_{x31}$) arranged, on the intersections of three substantially parallel straight lines $\alpha_i$ ($\alpha_1$, $\alpha_2$ and $\alpha_3$) and three substantially parallel straight lines $\beta_j$ ($\beta_1$, $\beta_2$ and $\beta_3$), wherein the straight lines $\alpha_i$ ($\alpha_1$, $\alpha_2$ and $\alpha_3$) are either substantially perpendicular to the straight lines $\beta_j$ ($\beta_1$, $\beta_2$ and $\beta_3$) (see FIG. 4A) or substantially not perpendicular to the straight lines $\beta_j$ ($\beta_1$, $\beta_2$ and $\beta_3$) (see FIG. 4B). The six first dipole magnets (x31) have their magnetic axes oriented to be substantially perpendicular to the first plane (P) (i.e. substantially perpendicular to the substrate (x20) surface). The first dipole magnets (331$_{1\text{-}1}$, 331$_{1\text{-}2}$ and 331$_{1\text{-}3}$) are disposed on the first straight line $\alpha_1$, the first dipole magnets (331$_{2\text{-}1}$, 331$_{2\text{-}2}$ and 331$_{2\text{-}3}$) are disposed on the second straight line $\alpha_2$ and the first dipole magnets (331$_{3\text{-}1}$, 331$_{3\text{-}2}$ and 331$_{3\text{-}3}$) are disposed on the third straight line $\alpha_3$. The first dipole magnet (431$_{1\text{-}1}$) has its South pole pointing towards the substrate surface during the process to produce the optical effect layer (OEL) described herein, the second first dipole magnets (431$_{1\text{-}2}$) has its North pole pointing towards the substrate surface and the third first dipole magnet (431$_{1\text{-}3}$) has its South pole pointing towards the towards the substrate surface. The first dipole magnet (431$_{2\text{-}1}$) has its North pole pointing towards the substrate surface, the second first dipole magnets (431$_{2\text{-}2}$) has its South pole pointing towards the substrate surface and the third first dipole magnet (431$_{2\text{-}3}$) has its North pole pointing towards the substrate surface. The first dipole magnet (431$_{3\text{-}1}$) has its South pole pointing towards the substrate surface during the process to produce the optical effect layer (OEL) described herein, the second first dipole magnets (431$_{3\text{-}2}$) has its North pole pointing towards the substrate surface and the third first dipole magnet (431$_{3\text{-}3}$) has its South pole pointing towards the towards the substrate surface. The first dipole magnets (x31) shown in FIG. 4A-B are arranged in such as a way that their North and South polarity is alternating along the three straight lines $\alpha_i$ ($\alpha_1$, $\alpha_2$ and $\alpha_3$) and along the three straight lines $\beta_j$ ($\beta_1$, $\beta_2$ and $\beta_3$), i.e. the South-North magnetic direction of two neighboring first dipole magnets along the straight lines $\alpha_i$ ($\alpha_1$ and $\alpha_2$) and along the straight lines $\beta_j$ ($\beta_1$ and $\beta_2$) are opposite.

The first dipole magnets (x31) of the first magnetic-field generating device (x30) described herein may have the same shape, may have the same dimensions and may be made of the same material.

The magnetic assembly (x00) comprises the second magnetic-field generating device (x40) described herein, said second magnetic-field generating device (x40) comprising one or more second dipole magnets (x41) having their magnetic axes oriented to be substantially parallel to the first plane (P) (i.e. (substantially parallel to the substrate during the process described herein), wherein said one or more second dipole magnets (x41) are partially or fully embedded in the second supporting matrix (x42) described herein.

According to one embodiment, the second magnetic-field generating device (x40) comprises one second dipole magnet (x41). According to another embodiment, the second magnetic-field generating device (x40) comprises two or more second dipole magnets (x41), wherein each of said two or more second dipole magnets (x41) has its magnetic axis oriented to be substantially parallel to the first plane (P) (substantially parallel to the substrate during the process described herein). For embodiments wherein the second magnetic-field generating device (x40) comprises the two or more second dipole magnets (x41) described herein, one of said two second dipole magnets is preferably disposed on top of the other one and said two or more second dipole magnets (x41) are preferably centered with respect to one another, i.e. the two or more second dipole magnets (x41) herein are stacked and more preferably coaxially arranged. For embodiments wherein the second magnetic-field generating device (x40) comprises the two or more second dipole magnets (x41) described herein, said two or more second dipole magnets may have their North poles pointing in the same direction or may have their North poles pointing in different directions (see for example FIG. 7A). For embodiments wherein the second magnetic-field generating device (x40) comprises the two or more second dipole magnets (x41) having their North poles pointing in the same direction, said two or more second dipole magnets (x41) may be disposed on top of each other or may be arranged side by side and said two or more second dipole magnets (x41) may be spaced apart but are preferably in direct contact. For embodiments wherein the second magnetic-field generating device (x40) comprises the two or more second dipole magnets (x41) having their North poles pointing in different directions, said two or more second dipole magnets (x41) are preferably disposed on top of each other and said two or more second dipole magnets (x41) are preferably in direct contact. According to one embodiment shown for example in FIG. 7A, the second magnetic-field generating device (x40) comprises the two second dipole magnets (x41) described herein, wherein each of said two second dipole magnets (x41) has its magnetic axis oriented to be substantially parallel to the first plane (P), wherein said two second dipole magnets (x41) have their North poles pointing in different directions, wherein one of said two second dipole magnets (x41) is disposed on top of the other one, wherein said two second dipole magnets (x41) are centered with respect to one another and wherein said two second dipole magnets (x41) are preferably in direct contact. For embodiments wherein the second magnetic-field generating device (x40) comprises the two or more second dipole magnets (x41) described herein, said two second dipole magnets may have the same shape, may have the same dimensions and may be made of the same material or may be different.

The second magnetic-field generating device (x40) described herein has a vector sum H of the magnetic axes of the one or more second dipole magnets (x41).

Each straight line $\alpha_i$ and the vector sum H of the magnetic axes of the one or more second dipole magnets (x41) of the second magnetic-field generating device (x40) are substantially non-parallel and substantially non-perpendicular with respect to each other. In other words and with reference to [017], each straight line $\alpha_i$ and the vector sum H of the magnetic axes of the one or more second dipole magnets (x41) form an angle $\gamma$ in the range from about 10° to about 80° or in the range from about 100° to about 170° or in the range from about 190° to about 260°, or in the range from about 280° to about 350°.

In embodiments wherein the second magnetic-field generating device (x40) comprises one second dipole magnet (x41), each straight line $\alpha_i$ and the vector sum H of the magnetic axis of the second dipole magnet (x41) forming the second magnetic-field generating device (x40) are substantially parallel to the substrate (x20) surface and are mutually skew. For these embodiments, each straight line $\alpha_i$ and the vector sum H of the magnetic axis of the second dipole magnet (x41), are substantially non-parallel and substantially non-perpendicular with respect to each other.

In embodiments wherein the second magnetic-field generating device (x40) comprises more than one, i.e. two or more, second dipole magnets (x41), each straight line $\alpha_i$ and the vector sum H of the one or more second dipole magnets (x41) forming the second magnetic-field generating device (x40) are substantially parallel to the substrate (x20) surface and are mutually skew. For these embodiments, each straight line $\alpha_i$ and the vector sum H of the magnetic axes of the more than one, i.e. two or more, second dipole magnets (x41) are substantially non-parallel and substantially non-perpendicular with respect to each other.

Each of the straight lines $\alpha_i$ and the vector sum H of the second magnetic-field generating device (x40) are substantially parallel to the substrate (x20) surface and are mutually skew (the angle between them is indicated by $\gamma$, as shown in FIGS. 6A and 7) and are substantially non-parallel and substantially non-perpendicular with respect to each other. Preferably, each straight line $\alpha_i$ and the vector sum H of the magnetic axes of the one or more second dipole magnets (x41) are substantially non-parallel and substantially non-perpendicular with respect to each other and form an angle $\gamma$ in the range from about 20° C. to about 70° or in the range from about 110° to about 160° or in the range from about 200° to about 250°, or in the range from about 290° to about 340°, more preferably in the range from about 30° to about 70° or in the range from about 120° to about 150° or in the range from about 210° to about 240°, or in the range from about 300° to about 330°.

The first dipole magnets (x31) of the first magnetic-field generating device (x30) and the one or more second dipole magnets (x41) of the second magnetic-field generating device (x40) are preferably independently made of high-coercivity materials (also referred as strong magnetic materials). Suitable high-coercivity materials are materials having a maximum value of energy product $(BH)_{max}$ of at least 20 kJ/m$^3$, preferably at least 50 kJ/m$^3$, more preferably at least 100 kJ/m$^3$, even more preferably at least 200 kJ/m$^3$. They are preferably made of one or more sintered or polymer bonded magnetic materials selected from the group consisting of Alnicos such as for example Alnico 5 (R1-1-1), Alnico 5 DG (R1-1-2), Alnico 5-7 (R1-1-3), Alnico 6 (R1-1-4), Alnico 8 (R1-1-5), Alnico 8 HC (R1-1-7) and Alnico 9 (R1-1-6); hexaferrites of formula $MFe_{12}0_{19}$, (e.g. strontium hexaferrite ($SrO*6Fe_20_3$) or barium hexaferrites ($BaO*6Fe_20_3$)), hard ferrites of the formula $MFe_20_4$ (e.g. as cobalt ferrite ($CoFe_20_4$) or magnetite ($Fe_3O_4$)), wherein M is a bivalent metal ion), ceramic 8 (SI-1-5); rare earth magnetic materials selected from the group comprising $RECo_5$ (with RE=Sm or Pr), $RE_2TM_{17}$ (with RE=Sm, TM=Fe, Cu, Co, Zr, Hf), $RE_2TM_{14}B$ (with RE=Nd, Pr, Dy, TM=Fe, Co); anisotropic alloys of Fe Cr Co; materials selected from the group of PtCo, MnAlC, RE Cobalt 5/16, RE Cobalt 14. Preferably, the high-coercivity materials of the dipole magnets are selected from the groups consisting of rare earth magnetic materials, and more preferably from the group consisting of $Nd_2Fe_{14}B$ and $SmCo_5$. Particularly preferred are easily workable permanent-magnetic composite materials that comprise a permanent-magnetic filler, such as strontium-hexaferrite ($SrFe_{12}O_{19}$) or neodymium-iron-boron ($Nd_2Fe_{14}B$) powder, in a plastic- or rubber-type matrix.

The distance (h1) between the uppermost surface of the first magnetic-field generating device (x30) and the lowermost surface of the substrate (x20) facing the first magnetic-field generating device (x30) is preferably between about 0.5 mm and about 10 mm, more preferably between about 0.5 mm and about 7 mm and still more preferably between about 1 mm and 7 mm. The distance (h2) between the lowermost surface of the first magnetic-field generating device (x30) described herein and the uppermost surface of the second magnetic-field generating device (x40) described herein is preferably between about 0 and about 10 mm, more preferably between about 0 mm and about 5 mm and still more preferably 0.

The first supporting matrix (x32) of the first magnetic-field generating device (x30) and the second supporting matrix (x42) of the second magnetic-field generating device (x40) described herein may independently have the shape of a disc or a regular polygon (with or without rounded corners) or of an irregular polygon (with or without rounded corners). The first supporting matrix (x32) of the first magnetic-field generating device (x30) and the second supporting matrix (x42) of the second magnetic-field generating device (x40) described herein are independently made of one or more non-magnetic materials. The non-magnetic materials are preferably selected from the group consisting of non-magnetic metals and engineering plastics and polymers. Non-magnetic metals include without limitation aluminum, aluminum alloys, brasses (alloys of copper and zinc), titanium, titanium alloys and austenitic steels (i.e. non-magnetic steels). Engineering plastics and polymers include without limitation polyaryletherketones (PAEK) and its derivatives polyetheretherketones (PEEK), polyetherketoneketones (PEKK), polyetheretherketoneketones (PEEKK) and polyetherketoneetherketoneketone (PEKEKK); polyacetals, polyamides, polyesters, polyethers, copolyetheresters, polyimides, polyetherimides, high-density polyethylene (HDPE), ultra-high molecular weight polyethylene (UHMWPE), polybutylene terephthalate (PBT), polypropylene, acrylonitrile butadiene styrene (ABS) copolymer, fluorinated and perfluorinated polyethylenes, polystyrenes, polycarbonates, polyphenylenesulfide (PPS) and liquid crystal polymers. Preferred materials are PEEK (polyetheretherketone), POM (polyoxymethylene), PTFE (polytetrafluoroethylene), Nylon® (polyamide) and PPS.

The magnetic assembly (x00) described herein may further comprise a magnetized plate comprising one or more surface reliefs, engravings and/or cut-outs representing one or more indicia, wherein said magnetized plate is disposed on top of the first magnetic-field generating device (x30). In other words, during the process to produce the optical effect layer (OEL) described herein, the substrate (x20) carrying the coating layer (x10) comprising the non-spherical magnetic or magnetizable pigment particles is disposed on top of the magnetized plate, said magnetized plate is placed on top of the first magnetic-field generating device (x30) and said first magnetic-field generating device (x30) is disposed on top of the second magnetic-field generating device (x40). Preferably, the first magnetic-field generating device (x30), the second (x40) magnetic-field generating device and the magnetized plate are substantially centered with respect to one another. As used herein, the term “indicia” shall mean designs and patterns, including without limitation symbols, alphanumeric symbols, motifs, letters, words, numbers, logos and drawings. The one or more surface reliefs, engravings and/or cut-outs of the magnetized plate bear the indicia that are transferred to the OEL in its non-cured state by locally modifying the magnetic field generated by the magnetic assembly (x00) described herein. Suitable examples of magnetized plates (x60) comprising the one or more surface reliefs, engravings and/or cut-outs described herein for the present invention can be found in in WO 2005/002866 $A_1$, WO 2008/046702 A1, WO 2008/139373 A1, WO 2018/019594 A1 and WO 2018/033512 A1.

The magnetized plate comprising one or more engravings and/or cut-outs described herein may be made from any mechanically workable soft-magnetic or hard-magnetic materials. Hard-magnetic materials include without limitation those described hereabove for the first dipole magnets (x31) of the first magnetic-field generating device (x30) and the second dipole magnets (x41) of the second magnetic-field generating device (x40). Soft-magnetic materials are characterized by their low coercivity and high permeability $\mu$. Their coercivity is lower than 1000 $Am^{-1}$ as measured according to IEC 60404-1:2000, to allow for a fast magnetization and demagnetization. Suitable soft-magnetic materials have a maximum relative permeability $\mu_{R\ max}$ of at least 5, where the relative permeability $\mu_R$ is the permeability of the material $\mu$ relative to the permeability of the free space $\mu_0$ ($\mu_R=\mu/\mu_0$) (Magnetic Materials, Fundamentals and Applications, $2^{nd}$ Ed., Nicola A. Spaldin, p. 16-17, Cambridge University Press, 2011). Soft-magnetic materials are described, for example, in the following handbooks: (1) Handbook of Condensed Matter and Materials Data, Chap. 4.3.2, Soft Magnetic Materials, p. 758-793, and Chap. 4.3.4, Magnetic Oxides, p. 811-813, Springer 2005; (2) Ferromagnetic Materials, Vol. 1, Iron, Cobalt and Nickel, p. 1-70, Elsevier 1999; (3) Ferromagnetic Materials, Vol. 2, Chap. 2, Soft Magnetic Metallic Materials, p. 55-188, and Chap. 3, Ferrites for non-microwave Applications, p. 189-241, Elsevier 1999; (4) Electric and Magnetic Properties of Metals, C. Moosbrugger, Chap. 8, Magnetically Soft Materials, p. 196-209, ASM International, 2000; (5) Handbook of modern Ferromagnetic Materials, Chap. 9, High-permeability High-frequency Metal Strip, p. 155-182, Kluwer Academic Publishers, 2002; and (6) Smithells Metals Reference Book, Chap. 20.3, Magnetically Soft Materials, p. 20-9-20-16, Butterworth-Heinemann Ltd, 1992.

Preferably, the magnetized plate described herein is a polymer-bonded plate of a soft-magnetic or hard-magnetic material, i.e. a magnetized plate made of a composite material comprising a polymer. The polymer (e.g. rubber- or plastic-like polymer) acts as a structural binder and the soft-magnetic or hard-magnetic material acts as an extender or filler. Magnetized plates made of a composite material comprising a polymer and a soft-magnetic or hard-magnetic material advantageously combine the desirable magnetic properties (e.g. high coercivity for a hard-magnetic material and permeability for a soft-magnetic material) with the desirable mechanical properties (flexibility, machine-ability, shock-resistance) of a malleable metal or a plastic material. Preferred polymers include rubber-type flexible materials such as nitrile rubbers, EPDM hydrocarbon rubbers, polyisoprenes, polyamides (PA), poly-phenylene sulfides (PPS), and chlorosulfonated polyethylenes.

Magnetized plates made of a composite material comprising a polymer and a permanent magnetic powder are obtainable from many different sources, such as from Group ARNOLD (Plastiform®) or from Materiali Magnetici, Albairate, Milano, IT (Plastoferrite).

The magnetized plate described herein, in particular the magnetized plate made of the composite material comprising the polymer and the soft-magnetic material or hard-magnetic material described herein, can be obtained in any desired size and form, e.g. as a thin, flexible plates which can be bent and mechanically worked, e.g. cut to size or shape, using commonly available mechanical ablation tools and machines, as well as air or liquid jet ablation, or laser ablation tools.

The one or more surface engravings and/or cut-outs of the magnetized plate (x60) described herein, in particular the magnetized plate made of the composite material comprising the polymer and the soft-magnetic material or hard-magnetic material described herein, may be produced by any cutting, engraving or forming methods known in the art including without limitation casting, molding, hand-engraving or ablation tools selected from the group consisting of mechanical ablation tools (including computer-controlled engraving tools), gaseous or liquid jet ablation tools, by chemical etching, electro-chemical etching and laser ablation tools (e.g. $CO^{2-}$, Nd-YAG or excimer lasers). As is understood by the person skilled in the art and described herein, the magnetized plate (x60) described herein, in particular the magnetized plate made of the composite material comprising the polymer and the soft-magnetic material or hard-magnetic material described herein, can also be cut or molded to a particular size and shape, rather than engraved. Holes may be cut out of it, or cut-out pieces may be assembled on a support.

The one or more engravings and cut-outs of the magnetized plate (x60), in particular the magnetized plate made of the composite material comprising the polymer and the soft-magnetic material or hard-magnetic material described herein, may be filled up with a polymer, which may contain fillers. For embodiments when the magnetized plate is made of a hard-magnetic material, said filler may be a soft magnetic material, for modifying the magnetic flux at the locations of the one or more engravings/cut-outs, or it may be any other type of magnetic or non-magnetic material, in order to modify the magnetic field properties, or to simply produce a smooth surface. The magnetized plate, in particular the magnetized plate (x60) made of the composite material comprising the polymer and the soft-magnetic material or hard-magnetic material described herein, may additionally be surface-treated for facilitating the contact with the substrate, reducing friction and/or wear and/or electrostatic charging in a high-speed printing application.

The present invention further provides printing apparatuses comprising a rotating magnetic cylinder and the one or more magnetic assemblies (x00) described herein, wherein said one or more magnetic assemblies (x00) are mounted to circumferential or axial grooves of the rotating magnetic cylinder as well as printing assemblies comprising a flatbed printing unit and one or more of the magnetic assemblies (x00) described herein, wherein said one or more magnetic assemblies are mounted to recesses of the flatbed printing unit. The present invention further provides uses of said printing apparatuses for producing the optical effect layers (OELs) described herein on a substrate such as those described herein.

The rotating magnetic cylinder is meant to be used in, or in conjunction with, or being part of a printing or coating equipment, and bearing one or more magnetic assemblies described herein. In an embodiment, the rotating magnetic cylinder is part of a rotary, sheet-fed or web-fed industrial printing press that operates at high printing speed in a continuous way.

The flatbed printing unit is meant to be used in, or in conjunction with, or being part of a printing or coating equipment, and bearing one or more of the magnetic assemblies described herein. In an embodiment, the flatbed printing unit is part of a sheet-fed industrial printing press that operates in a discontinuous way.

The printing apparatuses comprising the rotating magnetic cylinder described herein or the flatbed printing unit described herein may include a substrate feeder for feeding a substrate such as those described herein having thereon a layer of non-spherical magnetic or magnetizable pigment particles described herein, so that the magnetic assemblies generate a magnetic field that acts on the pigment particles to orient them to form the OEL described herein. In an embodiment of the printing apparatuses comprising a rotating magnetic cylinder described herein, the substrate is fed by the substrate feeder under the form of sheets or a web. In an embodiment of the printing apparatuses comprising a flatbed printing unit described herein, the substrate is fed under the form of sheets.

The printing apparatuses comprising the rotating magnetic cylinder described herein or the flatbed printing unit described herein may include a coating or printing unit for applying the radiation curable coating composition comprising the non-spherical magnetic or magnetizable pigment particles described herein on the substrate described herein, the radiation curable coating composition comprising non-spherical magnetic or magnetizable pigment particles that are oriented by the magnetic-field generated by the magnetic assemblies described herein to form an optical effect layer (OEL). In an embodiment of the printing apparatuses comprising a rotating magnetic cylinder described herein, the coating or printing unit works according to a rotary, continuous process. In an embodiment of the printing apparatuses comprising a flatbed printing unit described herein, the coating or printing unit works according to a linear, discontinuous process.

The printing apparatuses comprising the rotating magnetic cylinder described herein or the flatbed printing unit described herein may include a curing unit for at least partially curing the radiation curable coating composition comprising non-spherical magnetic or magnetizable pigment particles that have been magnetically oriented by the magnetic assemblies described herein, thereby fixing the orientation and position of the non-spherical magnetic or magnetizable pigment particles to produce an optical effect layer (OEL).

The present invention provides processes and methods for producing the optical effect layer (OEL) described herein on the substrate (x20) described herein, and the optical effect layers (OELs) obtained therewith, wherein said processes comprise a step i) of applying on the substrate (x20) surface the radiation curable coating composition comprising non-spherical magnetic or magnetizable pigment particles described herein, said radiation curable coating composition being in a first state so as to form a coating layer (x10). The radiation curable coating composition is in a first state, i.e. a liquid or pasty state, and is wet or soft enough, so that the non-spherical magnetic or magnetizable pigment particles dispersed in the radiation curable coating composition are freely movable, rotatable and/or orientable upon exposure to the magnetic field.

The step i) described herein may be carried by a coating process such as for example roller and spray coating processes or by a printing process. Preferably, the step i) described herein is carried out by a printing process preferably selected from the group consisting of screen printing, rotogravure printing, flexography printing, inkjet printing and intaglio printing (also referred in the art as engraved copper plate printing and engraved steel die printing), more preferably selected from the group consisting of screen printing, rotogravure printing and flexography printing.

Subsequently to, partially simultaneously with or simultaneously with the application of the radiation curable coating composition described herein on the substrate (x20) surface described herein (step i)), at least a part of the non-spherical magnetic or magnetizable pigment particles are oriented (step ii)) by exposing the radiation curable coating composition to the magnetic field of the magnetic assembly (x00) described herein and being static, so as to align at least part of the non-spherical magnetic or magnetizable pigment particles along the magnetic field lines generated by the magnetic assembly (x00).

Subsequently to or partially simultaneously with the step of orienting/aligning at least a part of the non-spherical magnetic or magnetizable pigment particles by applying the magnetic field described herein, the orientation of the non-spherical magnetic or magnetizable pigment particles is fixed or frozen. The radiation curable coating composition must thus noteworthy have a first state, i.e. a liquid or pasty state, wherein the radiation curable coating composition is wet or soft enough, so that the non-spherical magnetic or magnetizable pigment particles dispersed in the radiation curable coating composition are freely movable, rotatable and/or orientable upon exposure to the magnetic field, and a second cured (e.g. solid) state, wherein the non-spherical magnetic or magnetizable pigment particles are fixed or frozen in their respective positions and orientations.

Accordingly, the processes for producing an optical effect layer (OEL) on the substrate (x20) described herein comprises a step iii) of at least partially curing the radiation curable coating composition of step ii) to a second state so as to fix the non-spherical magnetic or magnetizable pigment particles in their adopted positions and orientations. The step iii) of at least partially curing the radiation curable coating composition may be carried out subsequently to or partially simultaneously with the step of orienting/aligning at least a part of the non-spherical magnetic or magnetizable pigment particles by applying the magnetic field described herein (step ii)). Preferably, the step iii) of at least partially curing the radiation curable coating composition is carried out partially simultaneously with the step of orienting/aligning at least a part of the non-spherical magnetic or magnetizable pigment particles by applying the magnetic field described herein (step ii)). By "partially simultaneously", it is meant that both steps are partly performed simultaneously, i.e. the times of performing each of the steps partially overlap. In the context described herein, when curing is performed partially simultaneously with the orientation step ii), it must be understood that curing becomes effective after the orientation so that the pigment particles have the time to orient before the complete or partial curing or hardening of the OEL.

The process for producing the optical effect layer (OEL) described herein may further comprise, prior to or at least partially simultaneously with step ii) a step (step ii2)) of exposing the coating layer (x10) to a dynamic magnetic field of a device so as to bi-axially orient at least a part of the platelet-shaped magnetic or magnetizable pigment particles, said step being carried out prior to or partially simultaneously with step ii) and before step iii). Processes comprising such a step of exposing a coating composition to a dynamic magnetic field of a device so as to bi-axially orient at least a part of the platelet-shaped magnetic or magnetizable pigment particles are disclosed in WO 2015/086257 A1. Subsequently to the exposure of the coating layer (x10) to the dynamic magnetic field of a magnetic assembly (x30)

such as those described in WO 2015/086257 Aland while the coating layer (x10) is still wet or soft enough so that the platelet-shaped I magnetic or magnetizable pigment particles therein can be further moved and rotated, the platelet-shaped magnetic or magnetizable pigment particles are further re-oriented by the use of the device described herein. Carrying out a bi-axial orientation means that platelet-shaped magnetic or magnetizable pigment particles are made to orientate in such a way that their two main axes are constrained. That is, each platelet-shaped magnetic or magnetizable pigment particle can be considered to have a major axis in the plane of the pigment particle and an orthogonal minor axis in the plane of the pigment particle. The major and minor axes of the platelet-shaped magnetic or magnetizable pigment particles are each caused to orient according to the dynamic magnetic field. Effectively, this results in neighboring the magnetic or magnetizable pigment particles that are close to each other in space to be essentially parallel to each other. In order to perform a bi-axial orientation, the magnetic or magnetizable pigment particles must be subjected to a strongly time-dependent external magnetic field.

Particularly preferred devices for bi-axially orienting the magnetic or magnetizable pigment particles are disclosed in EP 2 157 141 A1. The device disclosed in EP 2 157 141 A1 provides a dynamic magnetic field that changes its direction forcing the magnetic or magnetizable pigment particles to rapidly oscillate until both main axes, X-axis and Y-axis, become substantially parallel to the substrate surface, i.e. the magnetic or magnetizable pigment particles rotate until they come to the stable sheet-like formation with their X and Y axes substantially parallel to the substrate surface and are planarized in said two dimensions. Other particularly preferred devices for bi-axially orienting the magnetic or magnetizable pigment particles comprise linear permanent magnet Halbach arrays, i.e. assemblies comprising a plurality of magnets with different magnetization directions. Detailed description of Halbach permanent magnets was given by Z. Q. Zhu and D. Howe (Halbach permanent magnet machines and applications: a review, IEE. Proc. Electric Power Appl., 2001, 148, p. 299-308). The magnetic field produced by such a Halbach array has the properties that it is concentrated on one side while being weakened almost to zero on the other side. WO 2016/083259 A1 discloses suitable devices for bi-axially orienting magnetic or magnetizable pigment particles, wherein said devices comprise a Halbach cylinder assembly. Other particularly preferred for bi-axially orienting the magnetic or magnetizable pigment particles are spinning magnets, said magnets comprising disc-shaped spinning magnets or magnetic assemblies that are essentially magnetized along their diameter. Suitable spinning magnets or magnetic assemblies are described in US 2007/0172261 A1 now U.S. Pat. No. 7,934,451, said spinning magnets or magnetic assemblies generate radially symmetrical time-variable magnetic fields, allowing the bi-orientation of magnetic or magnetizable pigment particles of a not yet cured or hardened coating composition. These magnets or magnetic assemblies are driven by a shaft (or spindle) connected to an external motor. CN 102529326 B discloses examples of devices comprising spinning magnets that might be suitable for bi-axially orienting magnetic or magnetizable pigment particles. In a preferred embodiment, suitable devices for bi-axially orienting magnetic or magnetizable pigment particles are shaft-free disc-shaped spinning magnets or magnetic assemblies constrained in a housing made of non-magnetic, preferably non-conducting, materials and are driven by one or more magnet-wire coils wound around the housing. Examples of such shaft-free disc-shaped spinning magnets or magnetic assemblies are disclosed in WO 2015/082344 A1, WO 2016/026896 A1 and WO2018/141547 A1.

The first and second states of the radiation curable coating composition are provided by using a certain type of radiation curable coating composition. For example, the components of the radiation curable coating composition other than the non-spherical magnetic or magnetizable pigment particles may take the form of an ink or radiation curable coating composition such as those which are used in security applications, e.g. for banknote printing. The aforementioned first and second states are provided by using a material that shows an increase in viscosity in reaction to an exposure to an electromagnetic radiation. That is, when the fluid binder material is cured or solidified, said binder material converts into the second state, where the non-spherical magnetic or magnetizable pigment particles are fixed in their current positions and orientations and can no longer move nor rotate within the binder material.

As known to those skilled in the art, ingredients comprised in a radiation curable coating composition to be applied onto a surface such as a substrate and the physical properties of said radiation curable coating composition must fulfil the requirements of the process used to transfer the radiation curable coating composition to the substrate surface. Consequently, the binder material comprised in the radiation curable coating composition described herein is typically chosen among those known in the art and depends on the coating or printing process used to apply the radiation curable coating composition and the chosen radiation curing process.

In the optical effect layers (OELs) described herein, the non-spherical magnetic or magnetizable pigment particles described herein are dispersed in the cured/hardened radiation curable coating composition comprising a cured binder material that fixes/freezes the orientation of the magnetic or magnetizable pigment particles. The cured binder material is at least partially transparent to electromagnetic radiation of a range of wavelengths comprised between 200 nm and 2500 nm. The binder material is thus, at least in its cured or solid state (also referred to as second state herein), at least partially transparent to electromagnetic radiation of a range of wavelengths comprised between 200 nm and 2500 nm, i.e. within the wavelength range which is typically referred to as the "optical spectrum" and which comprises infrared, visible and UV portions of the electromagnetic spectrum, such that the particles comprised in the binder material in its cured or solid state and their orientation-dependent reflectivity can be perceived through the binder material. Preferably, the cured binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 μm of the cured binder material as present in the OEL (not including the platelet-shaped magnetic or magnetizable pigment particles, but all other optional components of the OEL in case such components are present) is at least 50%, more preferably at least 60%, even more preferably at least 70%, at the wavelength(s) concerned. This can be determined for example by measuring the transmittance of a test piece of the cured binder material (not including the non-spherical magnetic or magnetizable pigment particles) in accordance with well-established test methods, e.g. DIN 5036-3 (1979-11). If the OEL serves as a covert security feature, then typically technical means will be necessary to detect the (complete) optical effect generated by the OEL under respective illuminating conditions comprising the selected non-visible wavelength; said detection requiring that the wavelength of incident radiation is selected outside the visible range, e.g. in the near UV-range. The infrared, visible and UV portions of the electromagnetic spectrum approximately correspond to the wavelength ranges between 700-2500 nm, 400-700 nm, and 200-400 nm respectively.

As mentioned hereabove, the radiation curable coating composition described herein depends on the coating or printing process used to apply said radiation curable coating composition and the chosen curing process. Preferably, curing of the radiation curable coating composition involves a chemical reaction which is not reversed by a simple temperature increase (e.g. up to 80° C.) that may occur during a typical use of an article comprising the OEL described herein. The term "curing" or "curable" refers to processes including the chemical reaction, crosslinking or polymerization of at least one component in the applied radiation curable coating composition in such a manner that it turns into a polymeric material having a greater molecular weight than the starting substances. Radiation curing advantageously leads to an instantaneous increase in viscosity of the radiation curable coating composition after exposure to the curing irradiation, thus preventing any further movement of the pigment particles and in consequence any loss of information after the magnetic orientation step. Preferably, the curing step (step iii)) is carried out by radiation curing including UV-visible light radiation curing or by E-beam radiation curing, more preferably by UV-Vis light radiation curing.

Therefore, suitable radiation curable coating compositions for the present invention include radiation curable compositions that may be cured by UV-visible light radiation (hereafter referred as UV-Vis light radiation) or by E-beam radiation (hereafter referred as EB radiation). Radiation curable compositions are known in the art and can be found in standard textbooks such as the series "Chemistry & Technology of UV & EB Formulation for Coatings, Inks & Paints", Volume IV, Formulation, by C. Lowe, G. Webster, S. Kessel and I. McDonald, 1996 by John Wiley & Sons in association with SITA Technology Limited. According to one particularly preferred embodiment of the present invention, the radiation curable coating composition described herein is a UV-Vis radiation curable coating composition. Therefore, a radiation curable coating composition comprising non-spherical magnetic or magnetizable pigment particles described herein is preferably at least partially cured by UV-Vis light radiation, preferably by narrow-bandwidth LED light in the UV-A (315-400 nm) or blue (400-500 nm) spectral region, most preferable by a high-power LED source emitting in the 350 nm to 450 nm spectral region, with a typical emission bandwidth in the 20 nm to 50 nm range. UV radiation from mercury vapor lamps or doped mercury lamps can also be used to increase the curing rate of the radiation curable coating composition.

Preferably, the UV-Vis radiation curable coating composition comprises one or more compounds selected from the group consisting of radically curable compounds and cationically curable compounds. The UV-Vis radiation curable coating composition described herein may be a hybrid system and comprise a mixture of one or more cationically curable compounds and one or more radically curable compounds. Cationically curable compounds are cured by cationic mechanisms typically including the activation by radiation of one or more photoinitiators which liberate cationic species, such as acids, which in turn initiate the curing so as to react and/or cross-link the monomers and/or oligomers to thereby cure the radiation curable coating composition. Radically curable compounds are cured by free radical mechanisms typically including the activation by radiation of one or more photoinitiators, thereby generating radicals which in turn initiate the polymerization so as to cure the radiation curable coating composition. Depending on the monomers, oligomers or prepolymers used to prepare the binder comprised in the UV-Vis radiation curable coating compositions described herein, different photoinitiators might be used. Suitable examples of free radical photoinitiators are known to those skilled in the art and include without limitation acetophenones, benzophenones, benzyldimethyl ketals, alpha-aminoketones, alpha-hydroxyketones, phosphine oxides and phosphine oxide derivatives, as well as mixtures of two or more thereof. Suitable examples of cationic photoinitiators are known to those skilled in the art and include without limitation onium salts such as organic iodonium salts (e.g. diaryl iodoinium salts), oxonium (e.g. triaryloxonium salts) and sulfonium salts (e.g. triarylsulphonium salts), as well as mixtures of two or more thereof. Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures of two or more thereof. The one or more photoinitiators comprised in the UV-Vis radiation curable coating compositions are preferably present in a total amount from about 0.1 wt-% to about 20 wt-%, more preferably about 1 wt-% to about 15 wt-%, the weight percents being based on the total weight of the UV-Vis radiation curable coating compositions.

The radiation curable coating composition described herein may further comprise one or more marker substances or taggants and/or one or more machine readable materials selected from the group consisting of magnetic materials (different from the platelet-shaped magnetic or magnetizable pigment particles described herein), luminescent materials, electrically conductive materials and infrared-absorbing materials. As used herein, the term "machine readable material" refers to a material which can be comprised in a layer so as to confer a way to authenticate said layer or article comprising said layer by the use of a particular equipment for its authentication.

The radiation curable coating composition described herein may further comprise one or more coloring components selected from the group consisting of organic pigment particles, inorganic pigment particles and organic dyes and/or may further comprise non-magnetic or non-magnetizable optically variable pigments, and/or may further comprise one or more additives. The latter include without limitation compounds and materials that are used for adjusting physical, rheological and chemical parameters of the radiation curable coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the shelf life (polymerization inhibitors), the gloss etc. Additives described herein may be present in the radiation curable coating composition in amounts and in forms known in the art, including so-called nano-materials where at least one of the dimensions of the additive is in the range of 1 to 1000 nm.

The radiation curable coating composition described herein comprises the non-spherical magnetic or magnetizable pigment particles described herein. Preferably, the non-spherical magnetic or magnetizable pigment particles are present in an amount from about 2 wt-% to about 40 wt-%, more preferably about 4 wt-% to about 30 wt-%, the weight percents being based on the total weight of the radiation curable coating composition comprising the binder material, the non-spherical magnetic or magnetizable pigment particles and other optional components of the radiation curable coating composition.

Non-spherical magnetic or magnetizable pigment particles described herein are defined as having, due to their non-spherical shape, non-isotropic reflectivity with respect to an incident electromagnetic radiation for which the cured or hardened binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction. Preferably, the non-spherical magnetic or magnetizable pigment particles described herein have a non-isotropic reflectivity with respect to incident electromagnetic radiation in some parts or in the complete wavelength range of from about 200 to about 2500 nm, more preferably from about 400 to about 700 nm, such that a change of the particle's orientation results in a change of reflection by that particle into a certain direction. As known by the man skilled in the art, the magnetic or magnetizable pigment particles described herein are different from conventional pigments, in that said conventional pigment particles exhibit the same color and reflectivity, independent of the particle orientation, whereas the magnetic or magnetizable pigment particles described herein exhibit either a reflection or a color, or both, that depend on the particle orientation. The non-spherical magnetic or magnetizable pigment particles described herein are preferably platelet-shaped magnetic or magnetizable pigment particles.

Suitable examples of non-spherical magnetic or magnetizable pigment particles described herein include without limitation pigment particles comprising a magnetic metal selected from the group consisting of cobalt (Co), iron (Fe), gadolinium (Gd) and nickel (Ni); magnetic alloys of iron, chromium, manganese, cobalt, nickel and mixtures of two or more thereof; magnetic oxides of chromium, manganese, cobalt, iron, nickel and mixtures of two or more thereof; and mixtures of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of non-spherical magnetic or magnetizable pigment particles described herein include without limitation pigment particles comprising a magnetic layer M made from one or more of a magnetic metal such as cobalt (Co), iron (Fe), gadolinium (Gd) or nickel (Ni); and a magnetic alloy of iron, chromium, cobalt or nickel, wherein said platelet-shaped magnetic or magnetizable pigment particles may be multilayered structures comprising one or more additional layers. Preferably, the one or more additional layers are layers A independently made from one or more materials selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), preferably magnesium fluoride ($MgF_2$), silicon oxide (SiO), silicon dioxide ($SiO_2$), titanium oxide ($TiO_2$), zinc sulphide (ZnS) and aluminum oxide ($Al_2O_3$), more preferably silicon dioxide ($SiO_2$); or layers B independently made from one or more materials selected from the group consisting of metals and metal alloys, preferably selected from the group consisting of reflective metals and reflective metal alloys, and more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A multilayer structures, B/M multilayer structures, B/M/B multilayer structures, B/A/M/A multilayer structures, B/A/M/B multilayer structures, B/A/M/B/A/multilayer structures, wherein the layers A, the magnetic layers M and the layers B are chosen from those described hereabove.

According to one embodiment, at least a part of the non-spherical magnetic or magnetizable pigment particles described herein are dielectric/reflector/magnetic/reflector/dielectric multilayer structures, wherein the reflector layers described herein are independently made from the group consisting of metals and metal alloys as described hereabove for the B layers, wherein the dielectric layers are independently made from the group consisting the materials described hereabove for the A layers, and the magnetic layer preferably comprises one or more of a magnetic metal or a magnetic alloy such as those described hereabove for the M layer. Alternatively, the dielectric/reflector/magnetic/reflector/dielectric multilayer structures described herein may be multilayer pigment particles being considered as safe for human health and the environment, wherein said the magnetic layer comprises a magnetic alloy having a substantially nickel-free composition including about 40 wt-% to about 90 wt-% iron, about 10 wt-% to about 50 wt-% chromium and about 0 wt-% to about 30 wt-% aluminum.

At least part of the non-spherical magnetic or magnetizable pigment particles described herein may be constituted by non-spherical colorshifting magnetic or magnetizable pigment particles and/or non-spherical magnetic or magnetizable pigment particles having no colorshifting properties.

Preferably, at least a part of the non-spherical magnetic or magnetizable pigment particles described herein is constituted by non-spherical colorshifting magnetic or magnetizable pigment particles. In addition to the overt security provided by the colorshifting property of non-spherical colorshifting magnetic or magnetizable pigment particles, which allows easily detecting, recognizing and/or discriminating an article or security document carrying an ink, radiation curable coating composition, coating, or layer comprising the non-spherical colorshifting magnetic or magnetizable pigment particles described herein from their possible counterfeits using the unaided human senses, the optical properties of the non-spherical colorshifting magnetic or magnetizable pigment particles may also be used as a machine readable tool for the recognition of the optical effect layer (OEL). Thus, the optical properties of the non-spherical colorshifting magnetic or magnetizable pigment particles may simultaneously be used as a covert or semi-covert security feature in an authentication process wherein the optical (e.g. spectral) properties of the pigment particles are analyzed. The use of non-spherical colorshifting magnetic or magnetizable pigment particles in radiation curable coating compositions for producing an OEL enhances the significance of the OEL as a security feature in security document applications, because such materials (i.e. non-spherical colorshifting magnetic or magnetizable pigment particles) are reserved to the security document printing industry and are not commercially available to the public.

Moreover, and due to their magnetic characteristics, the non-spherical magnetic or magnetizable pigment particles described herein are machine readable, and therefore radiation curable coating compositions comprising those pigment particles may be detected for example with specific magnetic detectors. Radiation curable coating compositions comprising the non-spherical magnetic or magnetizable pigment particles described herein may therefore be used as a covert or semi-covert security element (authentication tool) for security documents.

As mentioned above, preferably at least a part of the non-spherical magnetic or magnetizable pigment particles is constituted by non-spherical colorshifting magnetic or magnetizable pigment particles. These can more preferably be selected from the group consisting of non-spherical magnetic thin-film interference pigment particles, non-spherical magnetic cholesteric liquid crystal pigment particles, non-spherical interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigment particles comprise pigment particles having a five-layer Fabry-Perot multilayer structure, and/or pigment particles having a six-layer Fabry-Perot multilayer structure, and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/di-electric/reflector/magnetic/dielectric/absorber multilayer structures.

Preferred seven-layer Fabry Perot multilayer structures consist of absorber/dielectric/re-flector/magnetic/reflector/dielectric/absorber multilayer structures such as disclosed in U.S. Pat. No. 4,838,648.

Preferably, the reflector layers described herein are independently made from one or more materials selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more materials selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicon oxide (SiO), silicon dioxide ($SiO_2$), titanium oxide ($TiO_2$), aluminum oxide ($Al_2O_3$), more preferably selected from the group consisting of magnesium fluoride ($MgF_2$) and silicon dioxide ($SiO_2$) and still more preferably magnesium fluoride ($MgF_2$). Preferably, the absorber layers are independently made from one or more materials selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), iron (Fe), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a $Cr/MgF_2/Al/M/Al/MgF_2/Cr$ multilayer structure, wherein M a magnetic layer comprising nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co).

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 A1 which is hereby incorporated by reference in its entirety.

Magnetic thin film interference pigment particles described herein are typically manufactured by an established deposition technique for the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to platelet-shaped pigment particles which have to be further processed by grinding, milling (such as for example jet milling processes) or any suitable method so as to obtain pigment particles of the required size. The resulting product consists of flat platelet-shaped pigment particles with broken edges, irregular shapes and different aspect ratios. Further information on the preparation of suitable platelet-shaped magnetic thin film interference pigment particles can be found e.g. in EP 1 710 756 A1 and EP 1 666 546 A1 which are hereby incorporated by reference.

Suitable magnetic cholesteric liquid crystal pigment particles exhibiting colorshifting characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose cholesteric multilayer pigment particles which comprise the sequence $A^1/B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicon dioxides ($SiO_2$), aluminum oxides ($Al_2O_3$), titanium oxides ($TiO_2$), graphites and mixtures of two or more thereof. Furthermore, one or more additional layers such as coloring layers may be present.

The non-spherical magnetic or magnetizable pigment particles described herein may be surface treated so at to protect them against any deterioration that may occur in the radiation curable coating composition and/or to facilitate their incorporation in the radiation curable coating composition; typically corrosion inhibitor materials and/or wetting agents may be used.

The substrate described herein is preferably selected from the group consisting of papers or other fibrous materials, such as cellulose, paper-comprising materials, glasses, metals, ceramics, plastics and polymers, metalized plastics or polymers, composite materials and mixtures or combinations thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical example of metals include without limitation aluminum (Al), chromium (Cr), copper (Cu), gold (Au), iron (Fe), nickel (Ni), silver (Ag), combinations thereof or alloys of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as sizing agents, whiteners, processing aids, reinforcing or wet strengthening agents, etc. The substrate described herein may be provided under the form of a web (e.g. a continuous sheet of the materials described hereabove) or under the form of sheets. Should the optical effect layer (OEL) produced according to the present invention be on a security document, and with the aim of further increasing the security level and the resistance against counterfeiting and illegal reproduction of said security document, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents, the substrate may comprise one or more marker substances or taggants and/or machine readable substances (e.g. luminescent substances, UV/visible/IR absorbing substances, magnetic substances and combinations thereof).

The shape of the coating layer (x10) of the optical effect layers (OELs) described herein may be continuous or discontinuous. According to one embodiment, the shape of the coating layer (x10) represent one or more indicia, dots and/or lines. The shape of the coating layer (x10) may consist of lines, dots and/or indicia being spaced apart from each other by a free area.

The optical effect layers (OELs) described herein may be provided directly on a substrate on which they shall remain permanently (such as for banknote applications). Alternatively, an OEL may also be provided on a temporary substrate for production purposes, from which the OEL is subsequently removed. This may for example facilitate the production of the OEL, particularly while the binder material is still in its fluid state. Thereafter, after at least partially curing the coating composition for the production of the OEL, the temporary substrate may be removed from the OEL.

Alternatively, an adhesive layer may be present on the OEL or may be present on the substrate comprising an OEL, said adhesive layer being on the side of the substrate opposite the side where the OEL is provided or on the same side as the OEL and on top of the OEL. Therefore, an adhesive layer may be applied to the OEL or to the substrate. Such an article may be attached to all kinds of documents or other articles or items without printing or other processes involving machinery and rather high effort. Alternatively, the substrate described herein comprising the OEL described herein may be in the form of a transfer foil, which can be applied to a document or to an article in a separate transfer step. For this purpose, the substrate is provided with a release coating, on which the OEL are produced as described herein. One or more adhesive layers may be applied over the so produced OEL.

Also described herein are substrates such as those described herein comprising more than one, i.e. two, three, four, etc. optical effect layers (OELs) obtained by the process described herein.

Also described herein are articles, in particular security documents, decorative elements or objects, comprising the optical effect layer (OEL) produced according to the present invention. The articles, in particular security documents, decorative elements or objects, may comprise more than one (for example two, three, etc.) OELs produced according to the present invention.

As mentioned herein, the optical effect layer (OEL) produced according to the present invention may be used for decorative purposes as well as for protecting and authenticating a security document. Typical examples of decorative elements or objects include without limitation luxury goods, cosmetic packaging, automotive parts, electronic/electrical appliances, furniture and fingernail lacquers.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) may be produced onto an auxiliary substrate such as for example a security thread, security stripe, a foil, a decal, a window or a label and consequently transferred to a security document in a separate step.

The skilled person can envisage several modifications to the specific embodiments described above without departing from the spirit of the present invention. Such modifications are encompassed by the present invention.

Further, all documents referred to throughout this specification are hereby incorporated by reference in their entirety as set forth in full herein.

EXAMPLES

Figure 7A:
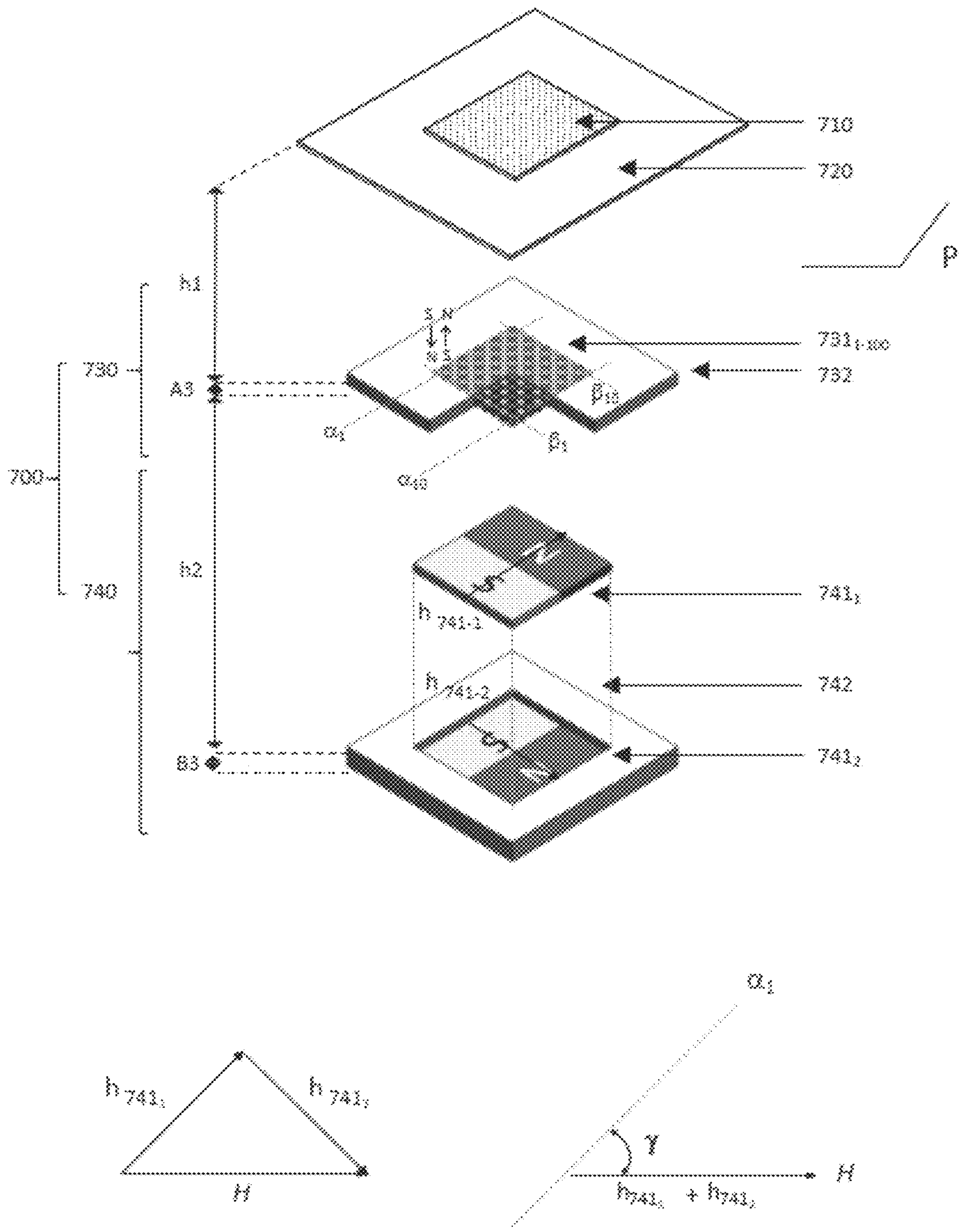
FIG. 7A schematically illustrates a magnetic assembly (700) for producing an optical effect layer (OEL) on a substrate (720). The magnetic assembly (700) comprises a first magnetic-field generating device (730) comprising 100 first dipole magnets (731$_1$, . . . , 731$_{100}$) having their magnetic axes oriented to be substantially perpendicular to the substrate (720) surface and being embedded in a first supporting matrix (732); and a second magnetic-field generating device (740) comprising two second dipole magnets (741$_1$ and 741$_2$) having their magnetic axes substantially parallel to the substrate (720) and being embedded in a second supporting matrix (742), wherein each of the 100 first dipole magnets (731$_1$, . . . , 731$_{100}$), in particular the center of each of them, of is arranged on the intersection of a grid comprising ten lines $\alpha_i$ (i=1, . . . , 10; $\alpha_1$ to $\alpha$10) and ten lines $\beta_j$ (j=1, . . . , 10; $\beta_1$ to $\beta_{10}$), said straight lines $\alpha_i$ being perpendicular to the straight lines $\beta_j$. On each straight line $\alpha_i$ ($\alpha_1$ to $\alpha_{10}$) and on each straight line $\beta_j$ ($\beta_1$ to $\beta_{10}$), neighboring first bar dipole magnets (731) have their North pole pointing in an opposite direction, wherein on each straight line $\alpha_i$ ($\alpha$1 to $\alpha$10) and on each straight line $\beta_j$($\beta_1$ to $\beta_{10}$), the first dipole magnets are arranged in such as a way that their North and South polarity is alternating along said straight lines $\alpha_i$ and $\beta_j$. The first dipole magnets (731$_1$, . . . , 731$_{100}$) and the second dipole magnets (741$_1$ and 741$_2$) are arranged in such a way that each straight line $\alpha_i$ and the sum vector H of the magnetic axis of the second dipole magnets (741$_1$ and 741$_2$) of form an angle $\gamma$ having a value of 45°, i.e. each straight line $\alpha_i$ and the sum vector H are non-parallel and non-perpendicular with respect to each other.
Figure 8A:
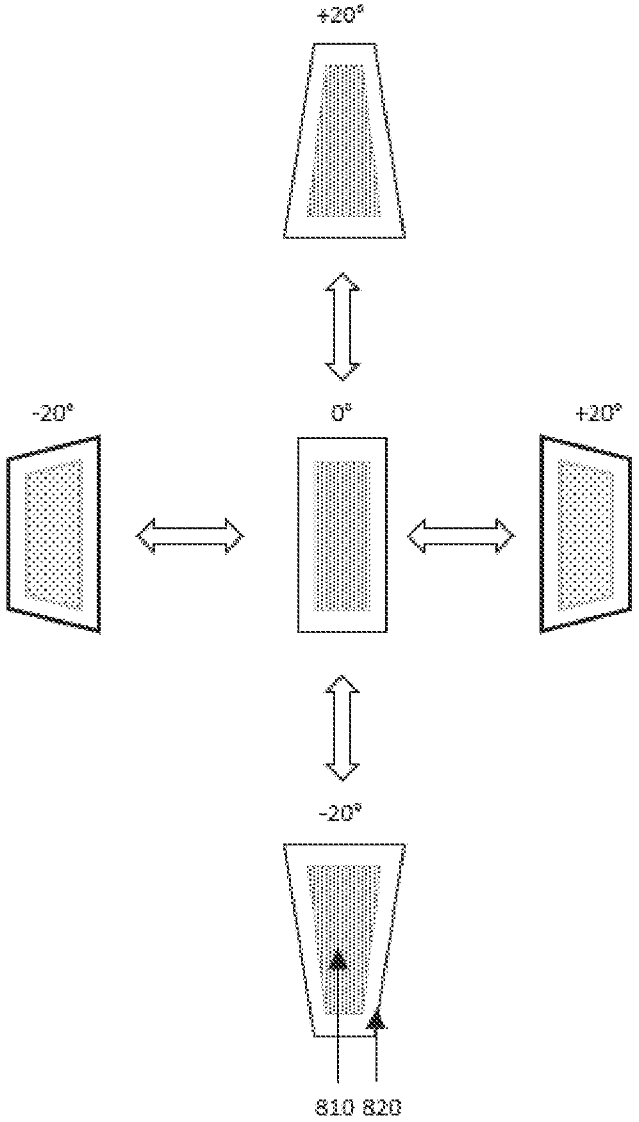
FIGS. 8A and 8B1-3 shows pictures of OELs obtained by using the apparatus illustrated in FIG. 6-7, as viewed under different viewing angles from −20° to +20° as shown in FIG. 8A.
Figures 1, 8B:
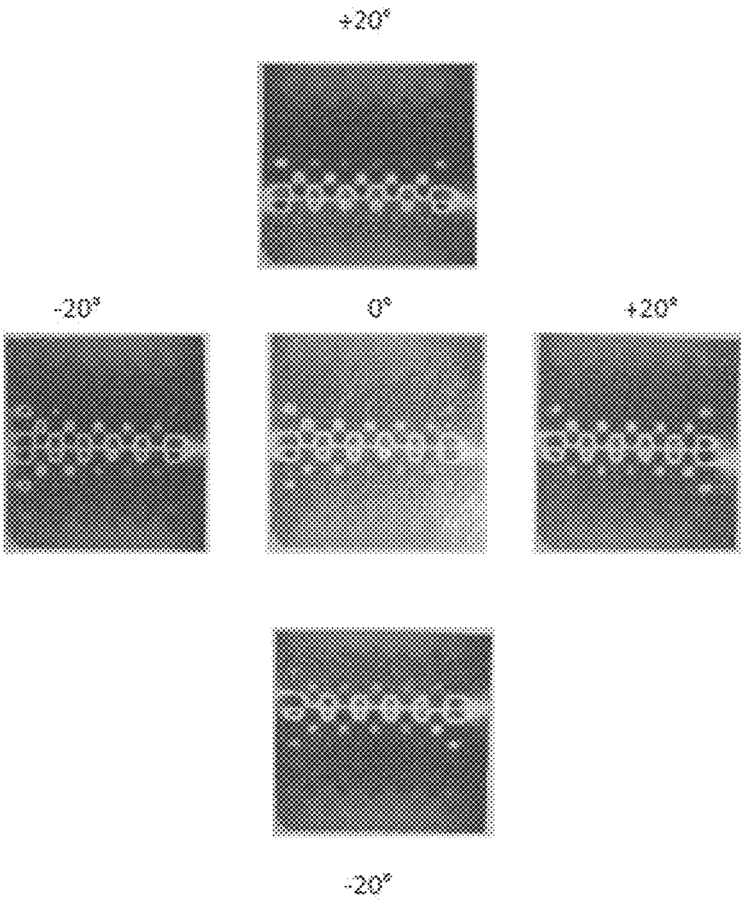

Magnetic assemblies (x00) illustrated in FIG. 5-7 were used to orient non-spherical in particular platelet shaped, optically variable magnetic pigment particles in a coating layer (x10) of the UV-curable screen printing ink described in Table 1 so as to produce optical effect layers (OELs) shown in FIG. 8B1-B3. The UV-curable screen printing ink was applied onto a black commercial paper (Gascogne Laminates M-cote 120) (x20), said application being carried out by hand screen printing using a T90 screen so as to form a coating layer (x10) having a thickness of about 20 μm and having a shape of a square with the following dimensions: 35 mm×35 mm. The substrate (x20) carrying the coating layer (x10) of the UV-curable screen printing ink was placed on the magnetic assembly (x00). The so-obtained magnetic orientation pattern of the platelet-shaped optically variable magnetic pigment particles was then, partially simultaneously with the orientation step, (i.e. while the substrate (x20) carrying the coating layer (x10) of the UV-curable screen printing ink was still in the magnetic field of the magnetic assembly (x00)), fixed by exposing for about 0.5 second to UV-curing the layer comprising the pigment particles using a UV-LED-lamp from Phoseon (Type FireFlex 50×75 mm, 395 nm, 8 W/cm$^2$).

TABLE 1

| UV-curable screen printing ink (coating composition): | |
|---|---|
| Epoxyacrylate oligomer | 28% |
| Trimethylolpropane triacrylate monomer | 19.5% |
| Tripropyleneglycol diacrylate monomer | 20% |
| Genorad 16 (Rahn) | 1% |
| Aerosil 200 (Evonik) | 1% |
| Speedcure TPO-L (Lambson) | 2% |
| Irgacure ® 500 (BASF) | 6% |
| Genocure ® EPD (Rahn) | 2% |
| BYK ® 371 (BYK) | 2% |
| Tego Foamex N (Evonik) | 2% |
| 7-layer colorshifting magnetic pigment particles (*) | 16.5% |

(*) gold-to-green colorshifting magnetic pigment particles having a flake shape (platelet-shaped pigment particles) of diameter d50 about 9 μm and thickness about 1 μm, obtained from Viavi Solutions, Santa Rosa, CA.

Comparative Example 1 (FIG. 5A-C and FIG. 8B-1)

Figure 5B:
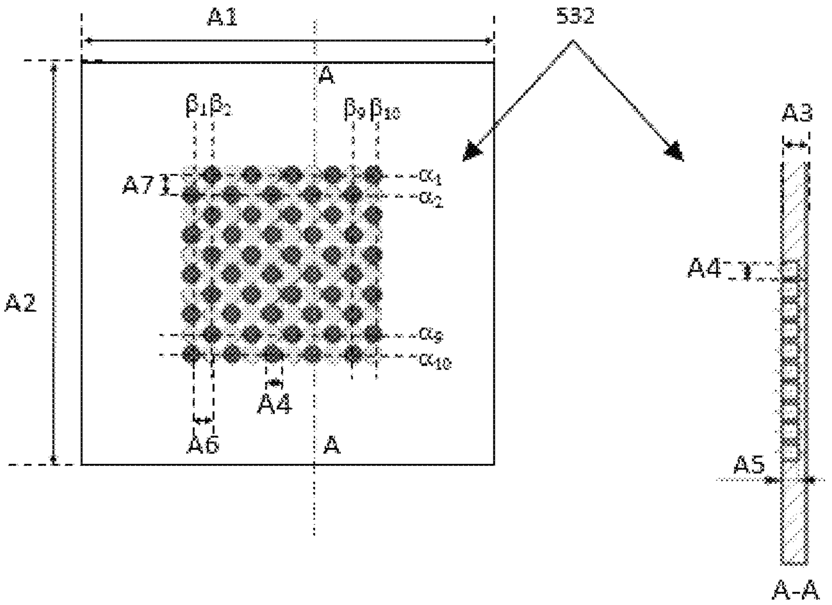
Figure 5C:
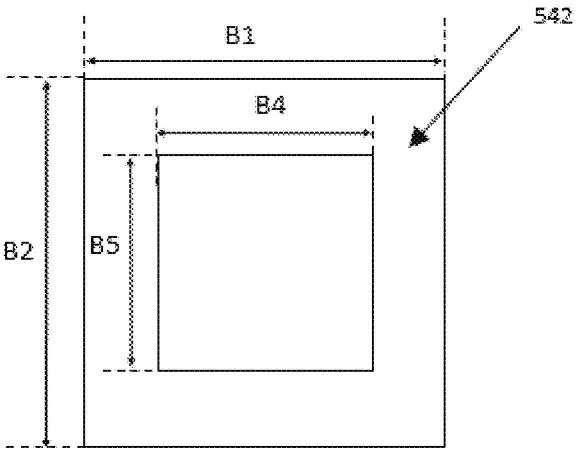

The magnetic assembly (500) used to prepare the optical effect layer (OEL) of Comparative Example 1 on the substrate (520) is illustrated in FIG. 5A-C. The magnetic assembly (500) was configured for receiving the substrate (520) in an orientation parallel to a first plane (P).

The magnetic assembly (500) comprised a first magnetic-field generating device (530) comprising 100 first bar dipole magnets ($531_{1-100}$) embedded in a first square-shaped supporting matrix (532) and a second magnetic-field generating device (540) comprising a second dipole magnet (541) embedded in a second square-shaped supporting matrix (542), wherein the second magnetic-field generating device (540) was disposed below the first magnetic-field generating device (530) and wherein first magnetic-field generating device (530) was disposed between the substrate (520) carrying the coating layer (510) and the second magnetic-field generating device (540). The first magnetic-field generating device (530) and the second magnetic-field generating device (540) were essentially centered with respect to one another.

The first magnetic-field generating device (530) comprised 100 first bar dipole magnets ($531_{1-100}$) having their respective centers arranged on the intersections of a grid comprising ten parallel straight lines $\alpha_i$ ($\alpha_{1-10}$) and ten parallel straight lines $\beta_j$ ($\beta_{1-10}$), wherein the straight lines $\alpha_i$ ($\alpha_{1-10}$) were parallel with respect to each other, the straight lines $\beta_j$ ($\beta_{1-10}$) were parallel with respect to each other and the straight lines $\alpha_i$ were perpendicular to the straight lines $\beta_j$. The ten lines $\alpha_i$ ($\alpha_{1-10}$) were equally spaced apart and neighboring lines were separated by a distance (A7) of 2.5 mm. The ten straight lines $\alpha_i$ ($\alpha_{1-10}$) comprised 10 first dipole magnets so that the total number of first dipole magnets was 100 ($531_{1-100}$). The ten lines $\beta_j$ ($\beta_{1-10}$) were equally spaced apart and neighboring lines were separated by a distance (A6) of 2.5 mm. On each straight line $\alpha_i$ ($\alpha_{1-10}$) and each straight line $\beta_j$ ($\beta_{1-10}$), the distance between two neighboring first bar dipole magnets was 0.5 mm.

The 100 first dipole magnets ($531_{1-100}$) were cylindrical with the following dimensions: 2 mm (A4, diameter)×2 mm (A5, length) and were made of NdFeB N45. The 100 first dipole magnets ($531_{1-100}$) were magnetized through their length (A5) and had their South-North magnetic axis being perpendicular to the substrate (520) surface. On each straight line $\alpha_i$ ($\alpha_{1-10}$) and each straight line $\beta_j$ ($\beta_{1-10}$), each first bar dipole magnet had its North pole pointing in the opposite direction as the North pole of its/their respective neighbouring magnets ($531_{1-100}$), as indicated by the S→N arrow in FIG. 5A. In other words, the 100 first dipole magnets ($531_{1-100}$) were disposed in a 10×10 arrangement in such a way that their North and South polarity was alternating, i.e. the South-North magnetic direction of two neighboring first dipole magnets along the straight lines $\alpha_i$ ($\alpha_{1-10}$) and the straight lines $\beta_j$ ($\beta_{1-10}$) (also along A1 and A2 directions) were opposite.

The first square-shaped supporting matrix (532) of the first magnetic-field generating device (530) had the following dimensions: 50 mm (A1)×50 mm (A2)×3 mm (A3), was made of polyoxymethylene (POM) and comprised 100 indentations for holding the 100 first dipole magnets ($531_{1-100}$), said indentations having the same dimensions as said 100 first dipole magnets ($531_{1-100}$) so that the uppermost surface of said 100 first dipole magnets ($531_{1-100}$) was flush with the uppermost surface of the first square-shaped supporting matrix (532).

The second dipole magnet (541) of the second magnetic-field generating device (540) was a square-shaped dipole magnet, had the following dimensions: 30 mm (B4)×30 mm (B5)×4 mm (B3) and was made of NdFeB N30. The second dipole magnet (541) had its South-North magnetic axis substantially parallel to the substrate (520) and perpendicular to each of the magnetic axes of the 100 first dipole magnets ($531_{1-100}$) of the first magnetic-field generating device (530). The second magnetic-field generating device (540) had its vector sum H (corresponding to the magnetic axis of the second dipole magnet (541)) substantially parallel to the substrate (520).

As shown in FIG. 5A, each straight line $\alpha_i$ ($\alpha_{1-9}$) and the vector sum H of the second magnetic-field generating device (540) formed an angle $\gamma$ of 0° (i.e. the straight line $\alpha_i$ ($\alpha_{1-10}$) were parallel with respect to the vector H).

The second square-shaped supporting matrix (542) of the second magnetic-field generating device (540) had the following dimensions: 50 mm (B1)×50 mm (B2)×10 mm (B3), was made of polyoxymethylene (POM) and comprised an indentation/hole for holding the second dipole magnet (541), said indentation/hole having the same shape and dimensions as the second dipole magnet (541) (i.e. 30 mm (B4)×30 mm (B5)×4 mm (B3)) so that the uppermost surface of said second dipole magnet (541) was flush with the uppermost surface of the second square-shaped supporting matrix (542).

The distance (h1) between the upper surface of the first square-shaped supporting matrix (532) of the first magnetic-field generating device (530) (also corresponding to the uppermost surface of the 100 first dipole magnets ($531_{1-100}$), and the surface of the substrate (520) facing the magnetic assembly (500) was 2 mm. The distance (h2) between the upper surface of the second dipole magnet (541) of the second magnetic-field generating device (540) and the lowermost surface of the square-shaped supporting matrix (532) of the first magnetic-field generating device (530) was 0 mm, i.e. the first (530) and second (540) magnetic-field generating devices were in direct contact.

The resulting OEL produced with the magnetic assembly (500) illustrated in FIG. 5A-C is shown in FIG. 8B-1 at different viewing angles by tilting the substrate (520) between −20° and +20°. The so-obtained OEL provides the optical impression of a plurality of dark and a plurality bright spots that are moving, appearing and/or disappearing only in a single direction (longitudinal direction) when the substrate carrying said OEL is tilted about two perpendicular axes, i.e. horizontal/latitudinal axis and vertical/longitudinal axis (no change when the substrate is tilted about the horizontal/latitudinal axis).

Example 1

Figure 6B:
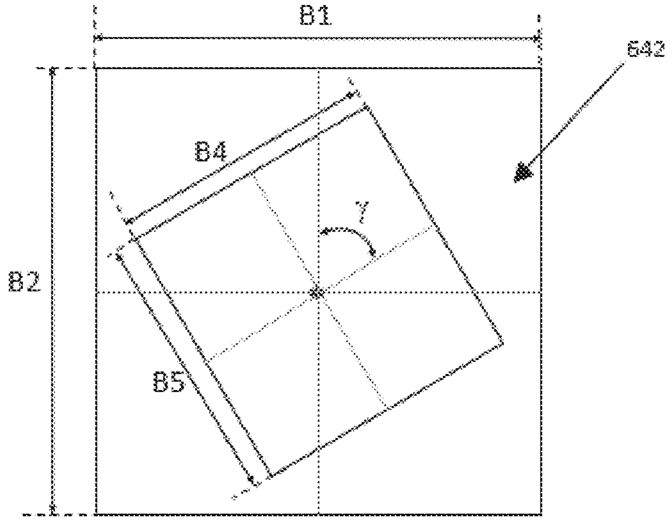

The magnetic assembly (600) used to prepare the optical effect layer (OEL) of Comparative example 1 on the substrate (620) is illustrated in FIG. 6A-B. The magnetic assembly (600) was configured for receiving the substrate (620) in an orientation parallel to a first plane (P).

The magnetic assembly (600) comprised a first magnetic-field generating device (630) comprising 100 first bar dipole magnets ($631_{1-100}$) embedded in a first square-shaped supporting matrix (632) and a second magnetic-field generating device (640) comprising a second dipole magnet (641) embedded in a second square-shaped supporting matrix (642), wherein the second magnetic-field generating device (640) was disposed below the first magnetic-field generating device (630) and wherein first magnetic-field generating device (630) was disposed between the substrate (620) carrying the coating layer (610) and the second magnetic-field generating device (640). The first magnetic-field generating device (630) and the second magnetic-field generating device (640) were essentially centered with respect to one another.

The first magnetic-field generating device (630) was the same as the one described for the comparative example C1.

The second dipole magnet (641) of the second magnetic-field generating device (640) was square-shaped dipole magnet, had the following dimensions: 30 mm (B4)×30 mm (B5)×4 mm (B3) and was made of NdFeB N52. The second dipole magnet (641) had its South-North magnetic axis substantially parallel to the substrate (620). The second magnetic-field generating device (640) had its vector sum H (corresponding to the magnetic axis of the sole second dipole magnet (641)) substantially parallel to the substrate (620).

As shown in FIG. 6A, each straight line $\alpha_i$ ($\alpha_{1-10}$) and the vector sum H of the second magnetic-field generating device (640) formed an angle γ of 45°.

The second square-shaped supporting matrix (642) of the second magnetic-field generating device (640) had the following dimensions: 50 mm (B1)×50 mm (B2)×4 mm (B3), was made of polyoxymethylene (POM) and comprised an indentation/hole for holding second dipole magnet (641), said indentation/hole having the same shape and dimensions as the second dipole magnet (641) (i.e. 30 mm (B4)×30 mm (B5)×4 mm (B3)) so that the uppermost surface of said second dipole magnet (641) was flush with the uppermost surface of the second square-shaped supporting matrix (642).

The distance (h1) between the upper surface of the first square-shaped supporting matrix (632) of the first magnetic-field generating device (630) (also corresponding to the upper surface of the 41 first dipole magnets 631$_{1-41}$) and the surface of the substrate (620) facing the magnetic assembly (600) was 1.5 mm. The distance (h2) between the upper surface of the second dipole magnet (641) of the second magnetic-field generating device (640) and the lowermost surface of the square-shaped supporting matrix (632) of the first magnetic-field generating device (630) was 0 mm, i.e. the first (630) and second (640) magnetic-field generating devices were in direct contact.

Figures 2, 8B:
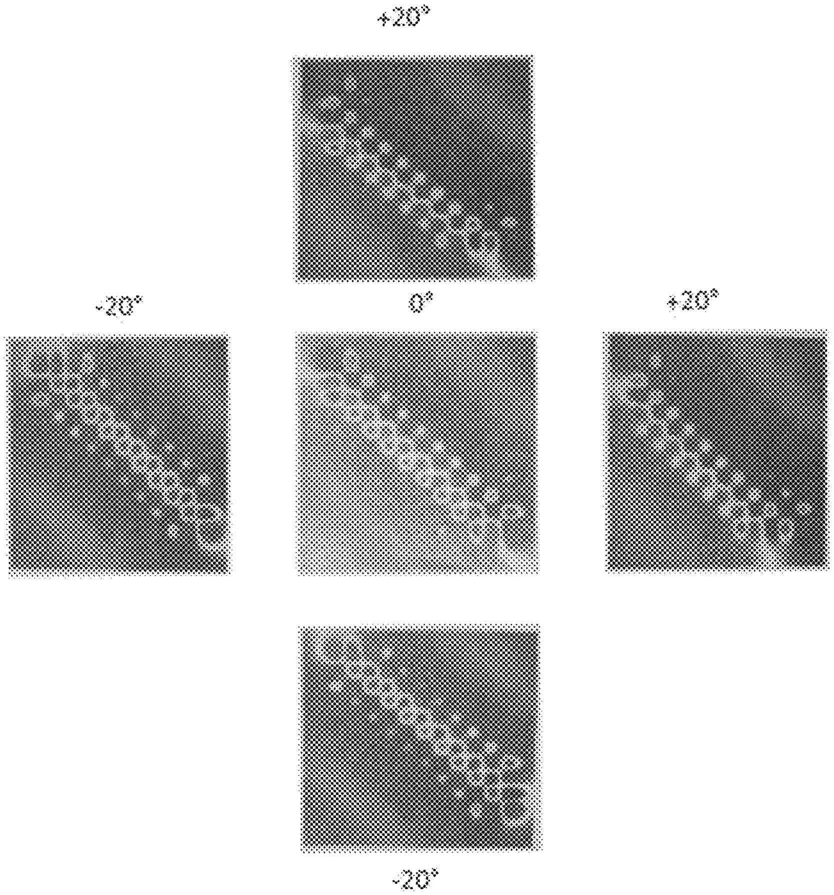

The resulting OEL produced with the magnetic assembly (600) illustrated in FIG. 6A-B is shown in FIG. 8B-2 at different viewing angles by tilting the substrate (620) between −20° and +20°. The so-obtained OEL provides the optical impression of a plurality of dark an and a plurality d bright spots that are moving, appearing and/or disappearing in a diagonal direction with reference to the longitudinal and latitudinal tilting directions when the substrate carrying said OEL is tilted about two perpendicular axes, i.e. horizontal/latitudinal axis and vertical/longitudinal axis.

Example 2

The magnetic assembly (700) used to prepare the optical effect layer (OEL) of Example 2 on the substrate (720) is illustrated in FIG. 7A. The magnetic assembly (700) was configured for receiving the substrate (720) in an orientation parallel to a first plane (P).

The magnetic assembly (700) comprised a first magnetic-field generating device (730) comprising 100 first bar dipole magnets (731$_{1-100}$) embedded in a first square-shaped supporting matrix (732) and a second magnetic-field generating device (740) comprising two second dipole magnet (741$_1$ and 741$_{-2}$), i.e. a first second dipole magnet (741$_1$) and a second second dipole magnet (741$_2$), embedded in a second square-shaped supporting matrix (742), wherein the first second dipole magnet (741$_1$) was disposed on top of the second second dipole magnet (741$_2$), wherein the second magnetic-field generating device (740) was disposed below the first magnetic-field generating device (730) and wherein first magnetic-field generating device (730) was disposed between the substrate (720) carrying the coating layer (710) and the second magnetic-field generating device (740). The first magnetic-field generating device (730) and the second magnetic-field generating device (740) were essentially centered with respect to one another.

The first magnetic-field generating device (730) was the same as the one described for the comparative example C1.

The second magnetic-field generating device (740) comprised two second dipole magnets (741$_1$ and 741$_{-2}$), both being square-shaped dipole magnets, the first second dipole magnet (741$_1$) having the following dimensions: 30 mm (B4)×30 mm (B5)×2 mm, the second second dipole magnet (741$_2$) having the following dimensions: 30 mm (B4)×30 mm (B5)×3 mm and both being made of NdFeB N52. The two second dipole magnets (741$_1$ and 741$_{-2}$) had their South-North magnetic axis substantially parallel to the substrate (720). As shown in FIG. 7A, the magnetic axis of the first second dipole magnet (741$_1$) was perpendicular to the magnetic axis of the second second dipole magnet (741$_2$).

The second magnetic-field generating device (740) comprised the same second square-shaped supporting matrix (742) as the one used the comparative example C1 except that the dimension B3 was 5 mm (i.e. the depth of the indentation) so that the indentation/hole for holding the two second dipole magnet (741$_1$ and 741$_{-2}$) had the same shape and dimensions as the two second dipole magnets (741$_1$ and 741$_{-2}$) (i.e. 30 mm (B4)×30 mm (B5)×5 mm (B3=2+3)) so that the uppermost surface of the first second dipole magnet (741$_1$) was flush with the uppermost surface of the second square-shaped supporting matrix (742) and so that the two second dipole magnets (741$_1$ and 741$_{-2}$) were stacked together, centered and in direct contact with each other. The second magnetic-field generating device (740) had a vector sum H (resulting from the addition of the magnetic axes of the first (741$_1$) and second (742$_2$) second dipole magnets) substantially parallel to the substrate (820).

As shown in FIG. 7, for each straight line $\alpha_i$ ($\alpha_{1-10}$), said line and the vector sum H of the second magnetic-field generating device (740) formed an angle γ of 45°.

The distance (h1) between the uppermost surface of the first square-shaped supporting matrix (732) of the first magnetic-field generating device (730) (also corresponding to the uppermost surface of the 100 first dipole magnets 731$_{1-100}$) and the surface of the substrate (720) facing the magnetic assembly (700) was about 2 mm. The distance (h2) between the upper surface of the second dipole magnet (741) of the second magnetic-field generating device (740) and the lowermost surface of the square-shaped supporting matrix (732) of the first magnetic-field generating device (730) was 0 mm, i.e. the first (730) and second (640) magnetic-field generating devices were in direct contact.

Figures 3, 8B:
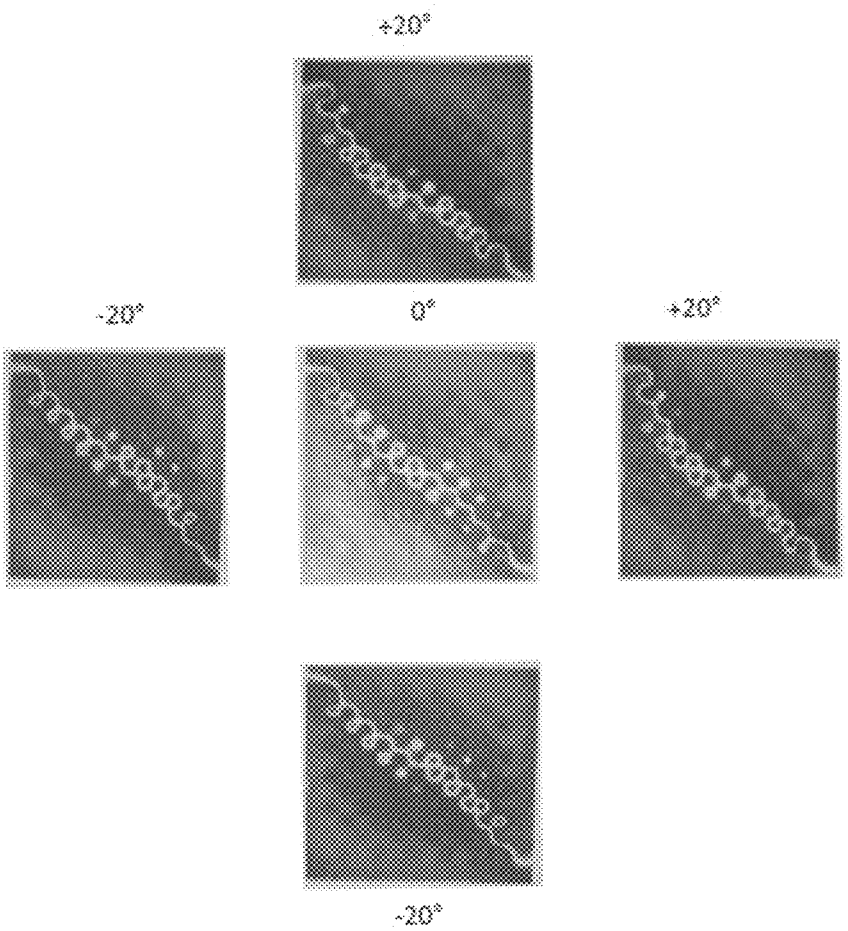

The resulting OEL produced with the magnetic assembly (700) illustrated in FIG. 7A is shown in FIG. 8B-3. The so-obtained OEL provides the optical impression of a plurality of dark and a plurality bright spots that are moving, appearing and/or disappearing in a diagonal direction with respect to the longitudinal and latitudinal tilting directions when the substrate carrying said OEL is tilted about two perpendicular axes, i.e. horizontal/latitudinal axis and vertical/longitudinal axis.

The invention claimed is:

1. A magnetic assembly for producing an optical effect layer on a substrate, said magnetic assembly being configured for receiving the substrate in an orientation at least partially parallel to a first plane and above the first plane and further comprising:

a) a first magnetic-field generating device comprising at least four first dipole magnets having their magnetic axes oriented to be substantially perpendicular to the first plane, wherein each of the first dipole magnets is arranged on an intersection of at least two substantially parallel straight lines $\alpha_i$ (i=1, 2, . . . ) and at least two substantially parallel straight lines $\beta_j$ (j=1, 2, . . . ), the straight lines $\alpha_i$ and $\beta_j$ forming a grid, wherein at least two first dipole magnets are disposed on one of the straight lines $\alpha_i$ and at least two other first dipole magnets are disposed on another one of the straight lines $\alpha_i$, wherein, on each straight line $\alpha_i$, and on each straight line $\beta_j$, neighboring first bar dipole magnets have their North pole pointing in an opposite direction and, wherein the first dipole magnets of said first magnetic-field generating device are partially or fully embedded in a first supporting matrix; and b) a second magnetic-field generating device comprising one or more second dipole magnets having their magnetic axes oriented to be substantially parallel to the first plane and wherein the one or more second dipole magnets are partially or fully embedded in a second supporting matrix;

wherein the second magnetic-field generating device is disposed below the first magnetic-field generating device, and wherein each straight line $\alpha_i$ and a vector sum H of the magnetic axes of the one or more second dipole magnets are substantially non-parallel and substantially non-perpendicular with respect to each other.

2. The magnetic assembly according to claim 1, wherein each straight line $\alpha_i$ and the vector sum H of the magnetic axes of the one or more second dipole magnets form an angle $\gamma$ in the range from about 20° to about 70° or in the range from about 110° to about 160° or in the range from about 200° to about 250°, or in the range from about 290° to about 340°.

3. The magnetic assembly according to claim 1, wherein the first magnetic-field generating device comprising at least six first dipole magnets and the grid comprises at least three of the substantially parallel straight lines $\alpha_i$ and at least two of the substantially parallel straight lines $\beta_j$, wherein at least two first dipole magnets are disposed on one of the straight lines $\alpha_i$ at least two other first dipole magnets are disposed on another one of the straight lines $\alpha_i$ and at least two other first dipole magnets are disposed on a further other one of the straight lines $\alpha_i$.

4. The magnetic assembly according to claim 1, wherein the first magnetic-field generating device comprises at least nine first dipole magnets and the grid comprises at least three of the substantially parallel straight lines $\alpha_i$ and at least three of the substantially parallel straight lines $\beta_j$, wherein at least three first dipole magnets are disposed on one of the straight lines $\alpha_i$, at least three first dipole magnets are disposed on another one of the straight lines $\alpha_i$ and at least three further first dipole magnets are disposed on a further other one of the straight lines $\alpha_i$.

5. The magnetic assembly according to claim 1, wherein, on each straight line $\alpha_i$ and/or each straight line $\beta_j$, neighboring first dipole magnets are spaced apart.

6. The magnetic assembly according to claim 5, wherein, on each straight line $\alpha_i$ and/or each straight line $\beta_j$, neighboring first dipole magnets are separated from each other by a same distance.

7. The magnetic assembly according to claim 1, wherein the second magnetic-field generating device comprises two or more second dipole magnets, each of said two or more second dipole magnets having its magnetic axis oriented to be substantially parallel to the first plane.

8. The magnetic assembly according to claim 7, wherein the second magnetic-field generating device comprises two second dipole magnets and wherein one of said two second dipole magnets is disposed on top of the other one of the second dipole magnets and wherein the two second dipole magnets have their North pole pointing in different directions.

9. A printing apparatus comprising a rotating magnetic cylinder or a flatbed printing unit, the rotating magnetic cylinder or the flatbed printing unit comprising at least one of the magnetic assemblies recited in claim 1.

10. The magnetic assembly according to claim 1, wherein all first dipole magnets present in the first magnetic-field generating device are located along any of the at least two substantially parallel straight lines $\alpha_i$ (i=1, 2, . . . ).

11. The magnetic assembly according to claim 1, wherein the first dipole magnets are the only magnets present within the first magnetic-field generating device.

12. A process for producing an optical effect layer on a substrate comprising the steps of:

i) applying on a substrate surface a radiation curable coating composition comprising non-spherical magnetic or magnetizable pigment particles, said radiation curable coating composition being in a first state so as to form a coating layer;

ii) exposing the radiation curable coating composition to a magnetic field of a static magnetic assembly recited in claim 1 so as to orient at least a part of the non-spherical magnetic or magnetizable pigment particles;

iii) at least partially curing the radiation curable coating composition of step ii) to a second state so as to fix the non-spherical magnetic or magnetizable pigment particles in their adopted positions and orientations.

13. The process according to claim 12, wherein at least a part of the plurality of non-spherical magnetic or magnetizable particles is constituted by non-spherical optically variable magnetic or magnetizable pigment particles.

14. The process according to claim 13, wherein the non-spherical optically variable magnetic or magnetizable pigments are selected from the group consisting of magnetic thin-film interference pigments, magnetic cholesteric liquid crystal pigments and mixtures thereof.

15. The process according to claim 12, further comprising a step of exposing the coating layer to a dynamic magnetic field of a device so as to bi-axially orient at least a part of the non-spherical magnetic or magnetizable particles, said step occurring prior to or at least partially simultaneously with step ii) and before step iii).

16. An optical effect layer produced by the process recited in claim 12.

17. The process according to claim 12, wherein step iii) is carried out by UV-Vis light radiation curing.

18. The process according to claim 17, wherein step iii) is carried out partially simultaneously with the step ii).

* * * * *